(12) United States Patent
Smith

(10) Patent No.: US 7,076,227 B1
(45) Date of Patent: Jul. 11, 2006

(54) RECEIVING SYSTEM WITH IMPROVED DIRECTIVITY AND SIGNAL TO NOISE RATIO

(75) Inventor: Harry B. Smith, Baltimore, MD (US)

(73) Assignee: Apex/Eclipse Systems, Inc., Baltimore, MD (US)

( * ) Notice: Subject to any disclaimer, the term of this patent is extended or adjusted under 35 U.S.C. 154(b) by 0 days.

(21) Appl. No.: 09/453,526

(22) Filed: Dec. 3, 1999

Related U.S. Application Data

(60) Provisional application No. 60/110,695, filed on Dec. 3, 1998.

(51) Int. Cl.
H04B 1/06 (2006.01)
H04B 7/00 (2006.01)

(52) U.S. Cl. ............ 455/278; 455/562.1; 455/277

(58) Field of Classification Search ........ 455/561, 455/562.1, 562, 132, 277.1, 277.2, 226.1, 455/226.2, 278.1, 279.1, 101, 104, 560; 342/373, 342/354, 350, 372, 157, 148; 370/320
See application file for complete search history.

(56) References Cited

U.S. PATENT DOCUMENTS

| | | | | | |
|---|---|---|---|---|---|
| 3,757,335 | A | * | 9/1973 | Gruenberg | 342/367 |
| 4,057,758 | A | * | 11/1977 | Hattori et al. | 375/267 |
| 4,238,746 | A | | 12/1980 | McCool et al. | |
| 4,539,689 | A | | 9/1985 | Chiu et al. | |
| 5,140,702 | A | * | 8/1992 | Laflin | 455/166.1 |
| 5,203,023 | A | * | 4/1993 | Saito et al. | 455/133 |
| 5,383,164 | A | * | 1/1995 | Sejnowski et al. | 367/134 |
| 5,459,668 | A | * | 10/1995 | Dogan et al. | 701/223 |
| 5,515,378 | A | * | 5/1996 | Roy et al. | 370/334 |
| 5,585,803 | A | * | 12/1996 | Miura et al. | 342/372 |
| 5,694,416 | A | * | 12/1997 | Johnson | 375/148 |
| 5,724,395 | A | | 3/1998 | Golla et al. | |
| 5,757,318 | A | * | 5/1998 | Reudink | 342/374 |
| 5,771,439 | A | * | 6/1998 | Kennedy et al. | 455/63.1 |
| 5,995,499 | A | * | 11/1999 | Hottinen et al. | 370/337 |
| 6,058,318 | A | * | 5/2000 | Kobayakawa et al. | 455/562.1 |
| 6,081,566 | A | * | 6/2000 | Molnar et al. | 375/347 |
| 6,104,935 | A | * | 8/2000 | Smith et al. | 455/562.1 |
| 6,167,286 | A | * | 12/2000 | Ward et al. | 455/562.1 |
| 6,185,440 | B1 | * | 2/2001 | Barratt et al. | 455/562.1 |
| 6,188,915 | B1 | * | 2/2001 | Martin et al. | 455/562.1 |
| 6,201,955 | B1 | * | 3/2001 | Jasper et al. | 455/277.2 |
| 6,236,862 | B1 | * | 5/2001 | Erten et al. | 455/501 |
| 6,266,528 | B1 | * | 7/2001 | Farzaneh | 455/423 |
| 6,330,431 | B1 | * | 12/2001 | Rostamy et al. | 455/226.1 |
| 6,640,110 | B1 | * | 10/2003 | Shapira et al. | 342/373 |
| 6,665,545 | B1 | * | 12/2003 | Raleigh et al. | 455/562.1 |

* cited by examiner

*Primary Examiner*—Tilahun Gesesse
(74) *Attorney, Agent, or Firm*—Cahn & Samuels, LLP

(57) ABSTRACT

A receive system providing enhanced directivity in the form of a narrowed receive beam and a relatively small antenna with performance comparable to a much larger antenna at similar frequencies. Received signals are converted to digital values and stored in a manner which enables subsequent processing directed to improving the resolution of the received signals and to reduce the associated noise corresponding to the received data samples. The Signal-to-Noise ratio of the received data signals is improved as a result of processing techniques made possible by the configuration of the antenna and the digitally stored nature of the received data.

64 Claims, 26 Drawing Sheets

θ=Target Angle Relative to Array Broadside

7x3 Array Used In Simulation

```
========== 0 dB ========== Trial  16 ========== I data ==========
Contents of original I array
0.7349    1.1123   1.4339   1.0919  -0.5505
1.7061    2.3358   2.3004            7  0.8836   0.3856   1.7902    LEFT   CENTER
0.5273    1.9065   0.7478   0.4199   8  0.3856   1.7902
                                     9  1.7902   1.2718            RIGHT After signs of right I elements reversed:
        ---------- I values ----------
1   0.7349   1.4339   1.0919   0.8836    10  1.7061   0.7478   0.8836   0.3856    13  -0.5273   0.7478    19  -2.152*
2   1.3760   1.0919   0.7478   0.3856    11  2.3004   2.2936   0.3856   1.7902    14  -1.9065  -1.5552    20  -0.312*
3   1.1123   0.7478   0.7902   1.7902    12  2.3358   2.1141   1.7902   1.2718    15  -2.2319  -2.2936    21  -1.271*
                                                                                   16  -0.4199
Sum 3.2232   3.2737   3.0593   3.0198                          6.3422   3.4220    17  -0.5505           -3.734*
Avg 1.0744   1.0912   1.0198   1.0074                          2.1141   1.1406    18  -2.2936  -2.1629  -1.245*
                                                                                                -0.7210
```

========== 0 dB === ======== Trial 17   Group 2 =========== Q data ============

Avg Q for sextet (w/ signs reversed) =  0.4769             # # # Actual noise avg  =   -0.2302 # # #

```
        Sextet QA's
          Q        QA
    4   0.0209   -0.4560
    5   0.3602   -0.1167  *
    6   0.7111    0.2342
   16   0.0031   -0.4738
   17  -0.2578   -0.7347
   18   2.0240    1.5471
```

| Left | Right | Pair Avg(A) | TA | | Q'A (C) | Delta(D) | Delta A(E) | Col 1 | Col 2 | Col 3 |
|---|---|---|---|---|---|---|---|---|---|---|
| 4 | 16 | 0.0089 | 0.0120 | b | -0.4649 | 0.0031 | <u>-0.5867</u> | -0.1217 | | |
| 4 | 17 | 0.1394 | -0.1185 | | -0.5954 | -0.2578 | -0.8476 | | -0.2522 | |
| 4 | 18 | -1.0016 | 1.0225 | | 0.5455 | 2.0240 | 1.4342 | | | <u>0.8887</u> |
| 5 | 16 | 0.1786 | 0.1817 | b | -0.2953 | 0.0031 | -0.5867 | -0.2914 | | |
| 5 | 17 | 0.3090 | 0.0512 | | -0.4257 | -0.2578 | -0.8476 | | -0.4218 | |
| 5 | 18 | -0.8319 | 1.1921 | | 0.7152 | 2.0240 | 1.4342 | | | <u>0.7191</u> |
| 6 | 16 | 0.3540 | 0.3571 | x | -0.1198 | 0.0031 | -0.5867 | -0.4668 | | |
| 6 | 17 | 0.4844 | 0.2267 | | -0.2503 | -0.2578 | -0.8476 | | -0.5973 | |
| 6 | 18 | -0.6565 | 1.3676 | # | 0.8906 | 2.0240 | 1.4342 | | | <u>0.5436</u> |
| Sum = | | -1.0157 | 4.2923 | | -0.0000 | 5.3079 | 0.0000 | -0.8800 | -1.2714 | 2.1514 |
| Avg = | | -0.1129 | 0.4769 | | -0.0000 | 0.5898 | 0.0000 | -0.2933 | -0.4238 | 0.7171 |

Dispersion =   2.393 : 1                 Comparison value =   -0.2933

Dispersion sum =   -0.4131                         (Inherently indicated by bb or BB in non key entries)
Dispersion dif =   -0.1697                         All same polarity, ∴ averageable; low dispersion ratio
Dispersion ratio =   0.1369 --> divided by 3 =     Case 1    average below threshold
                                        0.0456     Case 2    average above threshold
                                                   ?         Average between .73 to .83
   (Expected A1)
     Process A1              POLARITY of noise is: -         Comparison value is average

FIG. 11A

========== 0 dB ============= Trial 2 Group 3 =========== Q data ============

Avg Q for sextet (w/ signs reversed) = 0.1035  # # # Actual noise avg = -0.2625 # # #

Sextet QA's
| | Q | QA | |
|---|---|---|---|
| 7 | 1.3410 | 1.2375 | |
| 8 | 1.0595 | 0.9560 | |
| 9 | -0.6877 | -0.7912 | |
| 13 | -1.7936 | -1.8971 | |
| 14 | -0.5530 | -0.6565 | * |
| 15 | 1.2550 | 1.1515 | |

| Left | Right | Pair Avg(A) | B | | Q'A (C) | Delta(D) | Delta A(E) | Col 1 | Col 2 | Col 3 |
|---|---|---|---|---|---|---|---|---|---|---|
| 7 | 13 | 1.5673 | -0.3263 | | -0.3298 | -1.7936 | -1.4297 | | | -1.0999 |
| 7 | 14 | 0.9470 | 0.3940 | b | 0.2905 | -0.5530 | -0.1891 | -0.4796 | | |
| 7 | 15 | 0.0430 | 1.2980 | | 1.1945 | 1.2550 | 1.6189 | | 0.4244 | |
| 8 | 13 | 1.4266 | -0.3671 | | -0.4706 | -1.7936 | -1.4297 | | | -0.9592 |
| 8 | 14 | 0.8063 | 0.2533 | x | 0.1497 | -0.5530 | -0.1891 | -0.3389 | | |
| 8 | 15 | -0.0977 | 1.1573 | | 1.0537 | 1.2550 | 1.6189 | | 0.5651 | |
| 9 | 13 | 0.5530 | -1.2407 | # | -1.3442 | -1.7936 | -1.4297 | | | -0.0856 |
| 9 | 14 | -0.0673 | -0.6204 | B | -0.7239 | -0.5530 | -0.1891 | 0.5348 | | |
| 9 | 15 | -0.9713 | 0.2837 | | 0.1801 | 1.2550 | 1.6189 | | 1.4388 | |
| Sum = | | 4.2066 | 0.9318 | | 0.0000 | -3.2748 | 0.0000 | -0.2837 | 2.4283 | -2.1446 |
| Avg = | | 0.4674 | 0.1035 | | 0.0000 | -0.3639 | 0.0000 | | 0.8094 | -0.7149 |

Dispersion = -1.115 : 1  Comparison value = -0.2837

Dispersion sum = 0.0552
Dispersion dif = 1.0144     (Inherently Bb combination)
Dispersion ratio = 0.0544    One odd polarity, ∴ use sum: dispersion ratio low
                              Case 1    Σ less than threshold
                              Case 2    presence of sizable B
(Expected B1)                 sizable = > 67% of # in IA' column, where # is
Process B1   POLARITY of noise is: -    maximum value of polarity opposite to * polarity

FIG. 11B

========== 0 dB ============ Trial 1 Group 3 ========== Q data ============

Avg Q for sextet (w/ signs reversed) = 1.1320        # # # Actual noise avg = 0.7660 # # #

```
        Sextet QA's
           Q      QA
     7   1.6680  0.5860
     8   0.2348 -0.8972
     9   0.6360 -0.4960
    13   2.2163  1.0843
    14   0.8563 -0.2757
    15   1.1806  0.0486 *
```

| Left | Right | Pair Avg(A) | B | | Q'A (C) | Delta(D) | Delta A(E) | Col 1 | Col 2 | Col 3 |
|---|---|---|---|---|---|---|---|---|---|---|
| 7 | 13 | -0.2742 | 1.9422 | b | 0.8101 | 2.2163 | 0.7986 | -0.0116 | | |
| 7 | 14 | 0.4059 | 1.2622 | | 0.1301 | 0.8563 | -0.5614 | | -0.6916 | |
| 7 | 15 | 0.2437 | 1.4243 | | 0.2923 | 1.1806 | -0.2371 | | | -0.5294 |
| 8 | 13 | -0.9908 | 1.2256 | x | 0.0935 | 2.2163 | 0.7986 | 0.7050 | | |
| 8 | 14 | -0.3108 | 0.5456 | # | -0.5865 | 0.8563 | -0.5614 | | 0.0250 | |
| 8 | 15 | -0.4729 | 0.7077 | | -0.4243 | 1.1806 | -0.2371 | | | 0.1872 |
| 9 | 13 | -0.7901 | 1.4262 | b | 0.2941 | 2.2163 | 0.7986 | 0.5044 | | |
| 9 | 14 | -0.1102 | 0.7462 | | -0.3859 | 0.8563 | -0.5614 | | -0.1756 | |
| 9 | 15 | -0.2723 | 0.9083 | | -0.2237 | 1.1806 | -0.2371 | | | -0.0134 |
| Sum = | | -2.5716 | 10.1880 | | -0.0000 | 12.7596 | 0.0000 | 1.1979 | -0.8421 | -0.3557 |
| Avg = | | -0.2857 | 1.1320 | | -0.0000 | 1.4177 | 0.0000 | | | |

Dispersion = -43.547 : 1                Comparison value =    0.7050

Dispersion sum = 0.4928            (Inherently bb or BB)
Dispersion dif = 0.5160            Use key or * entry; high dispersion ratio
Dispersion ratio = 0.9551          Case 1   less than .73
                                   Case 2   greater than .83
                                            Comparison value is * index entry
(Expected C1)
 Process C1           POLARITY of noise is: +

FIG. 11C

========== 0 dB ============= Trial 4  Group 1 =========== Q data ============

Avg Q for sextet (w/ signs reversed) = 1.1629          ### Actual noise avg = 0.1628 ###

```
     Sextet QA's
       Q      QA
  1  2.6625  1.4997
  2  1.9091  0.7462
  3  1.0166 -0.1463*
 19  1.9264  0.7635
 20  0.1684 -0.9945
 21 -0.7059 -1.8688
```

| Left | Right | Pair Avg(A) | B | | Q'A (C) | Delta(D) | Delta A(E) | | Col 1 | Col 2 | Col 3 |
|---|---|---|---|---|---|---|---|---|---|---|---|
| 1 | 19 | 0.3681 | 2.2945 | # | 1.1316 | 1.9264 | 1.4634 | | | | 0.3318 |
| 1 | 20 | 1.2471 | 1.4155 | B | 0.2526 | 0.1684 | -0.2946 | x | -0.5472 | | |
| 1 | 21 | 1.6842 | 0.9783 |   | -0.1846 | -0.7059 | -1.1689 | | | -0.9843 | |
| 2 | 19 | -0.0086 | 1.9178 |   | 0.7549 | 1.9264 | 1.4634 | | | | 0.7085 |
| 2 | 20 | 0.8704 | 1.0388 | x | -0.1241 | 0.1684 | -0.2946 | | -0.1705 | | |
| 2 | 21 | 1.3075 | 0.6016 |   | -0.5613 | -0.7059 | -1.1689 | | | -0.6076 | |
| 3 | 19 | -0.4549 | 1.4715 |   | 0.3086 | 1.9264 | 1.4634 | | | | 1.1548 |
| 3 | 20 | 0.4241 | 0.5925 | b | -0.5704 | 0.1684 | -0.2946 | | 0.2758 | | |
| 3 | 21 | 0.8613 | 0.1554 |   | -1.0075 | -0.7059 | -1.1689 | | | -0.1614 | |
| Sum = | | 6.2990 | 10.4657 | | -0.0000 | 4.1667 | 0.0000 | | -0.4418 | -1.7533 | 2.1952 |
| Avg = | | 0.6999 | 1.1629 | | -0.0000 | 0.4630 | 0.0000 | | | -0.5844 | 0.7317 |

Dispersion = -1.984 : 1            Comparison value = 0.1053

Dispersion sum = -0.2714           (Inherently bB)     high dispersion ratio
Dispersion dif = -0.8230           Eliminate B When Σ < abs 11.31
Dispersion ratio = 0.3298          Eliminate (b) When Σ > 11.31
                                   Case 1    less than .73
(Expected D1)                      Case 2    greater than .83
  Process D1           POLARITY of noise is: +

FIG. 11D

Block Diagram Iterative Processing Scheme

Regular & Reverse "Scans"

Composite "V" Scan & "A" Scan

| | Min IA | -0.9v | -0.85v | -0.80v | -0.75v | -0.70v | -0.65v | -0.60v | -0.55v | -0.50v | -0.45v | -0.40v | -0.35v | -0.30v | -0.25v | -0.20v | -0.15v | -0.1v |
|---|---|---|---|---|---|---|---|---|---|---|---|---|---|---|---|---|---|---|
| === I data === | | | | | Group 1 | | | Noise Averages ### | | | ### Avgs Scanned in Opposite Sense ### | | | | | | | |
| Avg 20B | 0.041 | 1.206 / -0.552 | 1.156 / -0.502 | 1.106 / -0.452 | 1.056 / -0.402 | 1.006 / -0.352 | 1.956 / -0.302 | 0.906 / -0.252 | 0.856 / -0.202 | 0.806 / -0.152 | 0.756 / -0.102 | 0.706 / -0.052 | 0.656 / -0.002 | 0.606 / 0.048 | 0.556 / 0.098 | 0.506 / 0.148 | 0.456 / 0.198 | 0.406 / 0.248 |
| Avg 21A | -0.052 | -0.691 / -1.161 | 0.641 / -1.111 | 0.591 / -1.061 | 0.541 / -1.011 | 0.491 / -.961 | 0.441 / -0.911 | 0.391 / -0.861 | 0.341 / -0.811 | 0.291 / -0.761 | 0.241 / -0.711 | 0.191 / -0.661 | 0.141 / -0.611 | 0.091 / -0.561 | 0.041 / -0.511 | 0.009 / -0.461 | -0.059 / -0.411 | -0.109 / -0.361 |
| Avg 22A | 0.060 | 0.735 / -1.005 | 0.685 / -0.955 | 0.635 / -0.905 | 0.585 / -0.855 | 0.535 / -0.805 | 0.485 / -0.755 | 0.435 / -0.705 | 0.385 / -0.655 | 0.335 / -0.605 | 0.285 / -0.555 | 0.235 / -0.505 | 0.185 / -0.455 | 0.135 / -0.405 | 0.085 / -0.355 | 0.035 / -0.305 | 0.015 / -0.255 | -0.065 / -0.205 |
| Avg 23A | 0.022 | 0.654 / -1.124 | 0.604 / -1.074 | 0.554 / -1.024 | 0.504 / -0.974 | 0.454 / -0.924 | 0.404 / -0.874 | 0.354 / -0.824 | 0.304 / -0.774 | 0.254 / -0.724 | 0.204 / -0.674 | 0.154 / -0.624 | 0.104 / -0.574 | 0.054 / -0.524 | 0.004 / -0.474 | -0.046 / -0.424 | -0.096 / -0.374 | -0.146 / -0.324 |
| Avg 24A | -0.002 | 1.166 / -0.637 | 1.116 / -0.587 | 1.066 / -0.537 | 1.016 / -0.487 | 0.966 / -0.437 | 0.916 / -0.387 | 0.866 / -0.337 | 0.816 / -0.287 | 0.766 / -0.237 | 0.716 / -0.187 | 0.666 / -0.137 | 0.616 / -0.087 | 0.566 / -0.037 | 0.516 / 0.013 | 0.466 / 0.063 | 0.416 / 0.113 | 0.366 / 0.163 |
| Avg 25B | -0.032 | 1.100 / -0.732 | 1.050 / -0.682 | 1.000 / -0.632 | 0.950 / -0.582 | 0.900 / -0.532 | 0.850 / -0.482 | 0.800 / -0.432 | 0.750 / -0.382 | 0.700 / -0.332 | 0.650 / -0.282 | 0.600 / -0.232 | 0.550 / -0.182 | 0.500 / -0.132 | 0.450 / -0.082 | 0.400 / -0.032 | 0.350 / 0.018 | 0.300 / 0.068 |
| Avg 26B | 0.168 | 0.487 / -1.481 | 0.437 / -1.431 | 0.387 / -1.381 | 0.337 / -1.331 | 0.287 / -1.281 | 0.237 / -1.231 | 0.187 / -1.181 | 0.137 / -1.131 | 0.087 / -1.081 | 0.037 / -1.031 | 0.013 / -0.981 | -0.063 / -0.931 | -0.113 / -0.881 | -0.163 / -0.831 | -0.213 / -0.781 | -0.263 / -0.731 | -0.313 / -0.681 |
| Avg 27A | 0.120 | 0.924 / -0.756 | 0.874 / -0.706 | 0.824 / -0.656 | 0.774 / -0.606 | 0.724 / -0.556 | 0.674 / -0.506 | 0.624 / -0.456 | 0.574 / -0.406 | 0.524 / -0.356 | 0.474 / -0.306 | 0.424 / -0.256 | 0.374 / -0.206 | 0.324 / -0.156 | 0.274 / -0.106 | 0.224 / -0.056 | 0.174 / -0.006 | 0.124 / 0.044 |
| Avg 28C | 0.178 | 0.782 / -0.840 | 0.732 / -0.790 | 0.682 / -0.740 | 0.632 / -0.690 | 0.582 / -0.640 | 0.532 / -0.590 | 0.482 / -0.540 | 0.432 / -0.490 | 0.382 / -0.440 | 0.332 / -0.390 | 0.282 / -0.340 | 0.232 / -0.290 | 0.182 / -0.240 | 0.132 / -0.190 | 0.082 / -0.140 | 0.032 / -0.090 | 0.018 / -0.040 |
| Avg 29C | 0.128 | 1.246 / -0.683 | 1.196 / -0.633 | 1.146 / -0.583 | 1.096 / -0.533 | 1.046 / -0.483 | 0.996 / -0.433 | 0.946 / -0.383 | 0.896 / -0.333 | 0.846 / -0.283 | 0.796 / -0.233 | 0.746 / -0.183 | 0.696 / -0.133 | 0.646 / -0.083 | 0.596 / -0.033 | 0.546 / 0.017 | 0.496 / 0.067 | 0.446 / 0.117 |
| Avg 30B | 0.032 | 0.848 / -0.921 | 0.798 / -0.871 | 0.748 / -0.821 | 0.698 / -0.771 | 0.648 / -0.721 | 0.598 / -0.671 | 0.548 / -0.621 | 0.498 / -0.571 | 0.448 / -0.521 | 0.398 / -0.471 | 0.348 / -0.421 | 0.298 / -0.371 | 0.248 / -0.321 | 0.198 / -0.271 | 0.148 / -0.221 | 0.098 / -0.171 | 0.048 / -0.121 |
| Avg 31C | 0.174 | 0.786 / -1.187 | 0.736 / -1.137 | 0.686 / -1.087 | 0.636 / -0.037 | 0.586 / -0.987 | 0.536 / -0.937 | 0.486 / -0.887 | 0.436 / -0.837 | 0.386 / -0.787 | 0.336 / -0.737 | 0.286 / -0.687 | 0.236 / -0.637 | 0.186 / -0.587 | 0.136 / -0.537 | 0.086 / -0.487 | 0.036 / -0.437 | 0.014 / -0.387 |
| Avg 32C | -0.015 | 1.060 / -0.755 | 1.010 / -0.705 | 0.960 / -0.655 | 0.910 / -0.605 | 0.860 / -0.555 | 0.810 / -0.505 | 0.760 / -0.455 | 0.710 / -0.405 | 0.660 / -0.355 | 0.610 / -0.305 | 0.560 / -0.255 | 0.510 / -0.205 | 0.460 / -0.155 | 0.410 / -0.105 | 0.360 / -0.055 | 0.310 / 0.005 | 0.260 / 0.045 |
| Avg 33C | -0.080 | 0.993 / -0.887 | 0.943 / -0.837 | 0.893 / -0.787 | 0.843 / -0.737 | 0.793 / -0.687 | 0.743 / -0.637 | 0.693 / -0.587 | 0.643 / -0.537 | 0.593 / -0.487 | 0.543 / -0.437 | 0.493 / -0.387 | 0.443 / -0.337 | 0.393 / -0.287 | 0.343 / -0.237 | 0.393 / -0.187 | 0.243 / -0.137 | 0.193 / -0.087 |
| Avg 34A | 0.203 | 0.530 / -1.479 | 0.480 / -1.429 | 0.430 / -1.379 | 0.380 / -1.329 | 0.330 / -1.279 | 0.280 / -1.229 | 0.230 / -1.179 | 0.180 / -1.129 | 0.130 / -1.079 | 0.080 / -1.029 | 0.030 / -0.979 | 0.020 / -0.929 | -0.070 / -0.879 | -0.120 / -0.829 | -0.170 / -0.779 | -0.220 / -0.729 | -0.270 / -0.679 |
| Avg 35C | -0.083 | 1.035 / -0.848 | 0.985 / -0.798 | 0.935 / -0.748 | 0.885 / -0.698 | 0.835 / -0.648 | 0.785 / -0.598 | 0.735 / -0.548 | 0.685 / -0.498 | 0.635 / -0.448 | 0.585 / -0.398 | 0.535 / -0.348 | 0.485 / 0.298 | 0.435 / -0.248 | 0.385 / -0.198 | 0.335 / -0.148 | 0.285 / -0.098 | 0.235 / -0.048 |
| Avg 36B | 0.212 | 1.171 / -0.841 | 1.121 / -0.791 | 1.071 / -0.741 | 1.021 / -0.691 | 0.971 / -0.641 | 0.921 / -0.591 | 0.871 / -0.541 | 0.821 / -0.491 | 0.771 / -0.441 | 0.721 / -0.391 | 0.671 / -0.341 | 0.621 / -0.291 | 0.571 / -0.241 | 0.521 / -0.191 | 0.471 / -0.141 | 0.421 / -0.091 | 0.371 / -0.041 |
| Avg 37C | 0.015 | 1.024 / -0.761 | 0.974 / -0.711 | 0.924 / -0.661 | 0.874 / -0.611 | 0.824 / -0.561 | 0.774 / -0.511 | 0.724 / -0.461 | 0.674 / -0.411 | 0.624 / -0.361 | 0.574 / -0.311 | 0.524 / -0.261 | 0.474 / -0.211 | 0.424 / -0.161 | 0.374 / -0.111 | 0.324 / -0.061 | 0.274 / -0.011 | 0.224 / 0.039 |
| Avg 38B | 0.003 | 0.616 / -1.181 | 0.566 / -1.131 | 0.516 / -1.081 | 0.466 / -1.031 | 0.416 / -0.981 | 0.366 / -0.931 | 0.316 / -0.881 | 0.266 / -0.831 | 0.216 / -0.781 | 0.166 / -0.731 | 0.116 / -0.681 | 0.066 / -0.631 | 0.016 / -0.581 | 0.034 / -0.531 | -0.084 / -0.481 | -0.134 / -0.431 | -0.184 / -0.381 |

FIG. 13A

| === I data === | | | | | | | Group 1 | ### Noise Averages ### | | | | | | | | |
|---|---|---|---|---|---|---|---|---|---|---|---|---|---|---|---|---|
| -0.05V | 0.00V | 0.05V | 0.10V | 0.15V | 0.20V | 0.25V | 0.30V | 0.35V | 0.40V | 0.45V | 0.50V | 0.55V | 0.60V | 0.65V | 0.70V | 0.75V |
| 0.356 | 0.306 | 0.256 | 0.206 | 0.156 | 0.106 | 0.056 | 0.006 | -0.044 | -0.094 | -0.144 | -0.194 | -0.244 | -0.294 | -0.344 | -0.394 | -0.444 |
| 0.298 | 0.348 | 0.398 | 0.448 | 0.498 | 0.548 | 0.598 | 0.648 | 0.698 | 0.748 | 0.798 | 0.848 | 0.898 | 0.948 | 0.998 | 1.048 | 1.098 |
| -0.159 | -0.209 | -0.259 | -0.309 | -0.359 | -0.409 | -0.459 | -0.509 | -0.559 | 0.609 | -0.659 | -0.709 | -0.759 | -0.809 | -0.859 | -0.909 | -0.959 |
| -0.311 | -0.261 | -0.211 | -0.161 | -0.111 | -0.061 | -0.011 | 0.039 | 0.089 | 0.139 | 0.189 | 0.239 | 0.289 | 0.339 | 0.389 | 0.439 | 0.489 |
| -0.115 | -0.165 | -0.215 | -0.265 | -0.315 | -0.365 | -0.415 | -0.465 | -0.515 | -0.565 | -0.615 | -0.665 | -0.715 | -0.765 | -0.815 | -0.865 | -0.915 |
| -0.155 | -0.105 | -0.055 | -0.005 | 0.045 | 0.095 | 0.145 | 0.195 | 0.245 | 0.295 | 0.315 | 0.395 | 0.445 | 0.495 | 0.545 | 0.595 | 0.645 |
| -0.196 | -0.246 | -0.296 | -0.346 | -0.396 | -0.446 | -0.496 | -0.546 | -0.596 | -0.646 | -0.696 | -0.746 | -0.796 | -0.846 | -0.896 | -0.946 | -0.996 |
| -0.274 | -0.224 | -0.174 | -0.124 | -0.074 | -0.024 | 0.026 | 0.076 | 0.126 | 0.176 | 0.226 | 0.276 | 0.326 | 0.376 | 0.426 | 0.476 | 0.526 |
| 0.316 | 0.266 | 0.216 | 0.166 | 0.116 | 0.066 | 0.016 | -0.034 | -0.084 | -0.134 | -0.184 | -0.234 | -0.284 | -0.334 | -0.384 | -0.434 | -0.484 |
| 0.213 | 0.263 | 0.313 | 0.363 | 0.413 | 0.463 | 0.513 | 0.563 | 0.613 | 0.663 | 0.713 | 0.763 | 0.813 | 0.863 | 0.913 | 0.963 | 1.013 |
| 0.250 | 0.200 | 0.150 | 0.100 | 0.050 | 0.000 | -0.050 | -0.100 | -0.150 | -0.200 | -0.250 | -0.300 | -0.350 | -0.400 | -0.450 | -0.500 | -0.550 |
| 0.118 | 0.168 | 0.218 | 0.268 | 0.318 | 0.368 | 0.418 | 0.468 | 0.518 | 0.568 | 0.618 | 0.668 | 0.718 | 0.768 | 0.818 | 0.868 | 0.918 |
| -0.363 | -0.413 | -0.463 | -0.513 | -0.563 | -0.613 | -0.663 | -0.713 | -0.763 | -0.813 | -0.863 | -0.913 | -0.963 | -1.013 | -1.063 | -1.113 | -1.163 |
| -0.631 | -0.581 | -0.531 | -0.481 | -0.431 | -0.381 | -0.331 | -0.281 | -0.231 | -0.181 | -0.131 | -0.081 | -0.031 | 0.019 | 0.069 | 0.119 | 0.169 |
| 0.074 | 0.024 | -0.026 | -0.076 | -0.126 | -0.176 | -0.226 | -0.276 | -0.326 | -0.376 | -0.426 | -0.476 | -0.526 | -0.576 | -0.626 | -0.676 | -0.726 |
| 0.094 | 0.144 | 0.194 | 0.244 | 0.294 | 0.344 | 0.394 | 0.444 | 0.484 | 0.544 | 0.594 | 0.644 | 0.684 | 0.744 | 0.784 | 0.844 | 0.884 |
| -0.068 | -0.118 | -0.168 | -0.218 | -0.268 | -0.318 | -0.368 | -0.418 | -0.468 | -0.518 | -0.568 | -0.618 | -0.668 | -0.718 | -0.768 | -0.818 | -0.868 |
| 0.010 | 0.060 | 0.110 | 0.160 | 0.210 | 0.260 | 0.310 | 0.360 | 0.410 | 0.460 | 0.510 | 0.560 | 0.610 | 0.660 | 0.710 | 0.760 | 0.810 |
| 0.396 | 0.346 | 0.296 | 0.246 | 0.196 | 0.146 | 0.096 | 0.046 | -0.004 | -0.054 | -0.104 | -0.154 | -0.204 | -0.254 | -0.304 | -0.354 | -0.404 |
| 0.167 | 0.217 | 0.267 | 0.317 | 0.367 | 0.417 | 0.467 | 0.517 | 0.567 | 0.617 | 0.667 | 0.717 | 0.767 | 0.817 | 0.867 | 0.917 | 0.967 |
| 0.002 | -0.052 | -0.102 | -0.152 | -0.202 | -0.252 | -0.302 | -0.352 | -0.402 | -0.452 | -0.502 | -0.552 | -0.602 | -0.652 | -0.702 | -0.752 | -0.802 |
| -0.071 | -0.021 | 0.029 | 0.079 | 0.129 | 0.179 | 0.229 | 0.279 | 0.329 | 0.379 | 0.429 | 0.479 | 0.529 | 0.579 | 0.629 | 0.679 | 0.729 |
| -0.064 | -0.114 | -0.164 | -0.214 | -0.264 | -0.314 | -0.364 | -0.414 | -0.464 | -0.514 | -0.564 | -0.614 | -0.664 | -0.714 | -0.764 | -0.814 | -0.864 |
| -0.337 | -0.287 | -0.237 | -0.187 | -0.137 | -0.087 | -0.037 | 0.013 | 0.063 | 0.113 | 0.163 | 0.213 | 0.263 | 0.313 | 0.363 | 0.413 | 0.463 |
| 0.210 | 0.160 | 0.110 | 0.060 | 0.010 | -0.040 | -0.090 | -0.140 | -0.190 | -0.240 | -0.290 | -0.340 | -0.390 | -0.440 | -0.490 | -0.540 | -0.590 |
| 0.095 | 0.145 | 0.195 | 0.245 | 0.295 | 0.345 | 0.395 | 0.445 | 0.495 | 0.545 | 0.595 | 0.645 | 0.695 | 0.745 | 0.795 | 0.845 | 0.895 |
| 0.143 | 0.093 | 0.043 | 0.007 | -0.057 | -0.107 | -0.157 | -0.207 | -0.257 | -0.307 | -0.357 | -0.407 | -0.457 | -0.507 | -0.557 | -0.607 | -0.657 |
| -0.037 | 0.013 | 0.063 | 0.113 | 0.163 | 0.213 | 0.263 | 0.313 | 0.363 | 0.413 | 0.463 | 0.513 | 0.563 | 0.613 | 0.663 | 0.713 | 0.763 |
| -0.320 | -0.370 | -0.420 | -0.470 | -0.520 | -0.570 | -0.620 | -0.670 | -0.720 | -0.770 | -0.820 | -0.870 | -0.920 | -0.970 | -1.020 | -1.070 | -1.120 |
| -0.629 | -0.579 | -0.529 | -0.479 | -0.429 | -0.379 | -0.329 | -0.279 | -0.229 | -0.179 | -0.129 | -0.079 | -0.029 | 0.021 | 0.071 | 0.121 | 0.171 |
| 0.185 | 0.135 | 0.085 | 0.035 | -0.015 | -0.065 | -0.115 | -0.165 | -0.215 | -0.265 | -0.315 | -0.365 | -0.415 | -0.465 | -0.515 | -0.565 | -0.615 |
| 0.002 | 0.052 | 0.102 | 0.152 | 0.202 | 0.252 | 0.302 | 0.352 | 0.402 | 0.452 | 0.502 | 0.552 | 0.602 | 0.652 | 0.702 | 0.752 | 0.802 |
| 0.321 | 0.271 | 0.221 | 0.171 | 0.121 | 0.071 | 0.021 | -0.029 | -0.079 | -0.129 | -0.179 | -0.229 | -0.279 | -0.329 | -0.379 | -0.429 | -0.479 |
| 0.009 | 0.059 | 0.109 | 0.159 | 0.209 | 0.259 | 0.309 | 0.359 | 0.409 | 0.459 | 0.509 | 0.559 | 0.609 | 0.659 | 0.709 | 0.759 | 0.809 |
| 0.174 | 0.124 | 0.074 | 0.024 | -0.026 | -0.076 | -0.126 | -0.176 | -0.226 | -0.276 | -0.326 | -0.376 | -0.426 | -0.476 | -0.526 | -0.576 | -0.626 |
| 0.089 | 0.139 | 0.189 | 0.239 | 0.289 | 0.339 | 0.389 | 0.439 | 0.489 | 0.539 | 0.589 | 0.639 | 0.689 | 0.739 | 0.789 | 0.839 | 0.889 |
| -0.234 | -0.284 | -0.334 | -0.384 | -0.434 | -0.484 | -0.534 | -0.584 | -0.634 | -0.684 | -0.734 | -0.784 | -0.834 | -0.884 | -0.934 | -0.984 | -1.034 |
| -0.331 | -0.281 | -0.231 | -0.181 | -0.131 | -0.081 | -0.031 | 0.019 | 0.069 | 0.119 | 0.169 | 0.219 | 0.269 | 0.319 | 0.369 | 0.419 | 0.469 |

FIG. 13B

=== I data === 0 dB === Group 1      Average I Values      # # # Avgs Scanned in Opposite Sense # # #

| | Min IA | -.9v | -.85v | -.8v | -.75v | -.7v | -.65v | -.6v | -.55v | -.5v | -.45v | -.4v | -.35v | -.3v | -.25v | -.2v | -.15v | -.1v |
|---|---|---|---|---|---|---|---|---|---|---|---|---|---|---|---|---|---|---|
| Avg 20B | 0.041 | 2.431 0.672 | 2.381 0.722 | 2.331 0.772 | 2.281 0.822 | 2.231 0.872 | 2.181 0.922 | 2.131 0.972 | 2.081 1.022 | 2.031 1.072 | 1.981 1.122 | 1.931 1.172 | 1.881 1.222 | 1.831 1.272 | 1.781 1.322 | 1.731 1.372 | 1.681 1.422 | 1.631 1.472 |
| Avg 21A | -0.052 | 1.916 0.064 | 1.866 0.114 | 1.816 0.164 | 1.766 0.214 | 1.716 0.264 | 1.666 0.314 | 1.616 0.364 | 1.566 0.414 | 1.516 0.464 | 1.466 0.514 | 1.416 0.564 | 1.366 0.614 | 1.316 0.664 | 1.266 0.714 | 1.216 0.764 | 1.166 0.814 | 1.116 0.864 |
| Avg 22A | 0.060 | 1.960 0.220 | 1.910 0.270 | 1.860 0.320 | 1.810 0.370 | 1.760 0.420 | 1.710 0.470 | 1.660 0.520 | 1.610 0.570 | 1.560 0.620 | 1.510 0.670 | 1.460 0.720 | 1.410 0.770 | 1.360 0.820 | 1.310 0.870 | 1.260 0.920 | 1.210 0.970 | 1.160 1.020 |
| Avg 23A | 0.022 | 1.878 0.101 | 1.828 0.151 | 1.778 0.201 | 1.728 0.251 | 1.678 0.301 | 1.628 0.351 | 1.578 0.401 | 1.528 0.451 | 1.478 0.501 | 1.428 0.551 | 1.378 0.601 | 1.328 0.651 | 1.278 0.701 | 1.228 1.751 | 1.178 0.801 | 1.128 0.851 | 1.078 0.901 |
| Avg 24A | -0.002 | 2.390 0.588 | 2.340 0.638 | 2.290 0.688 | 2.240 0.738 | 2.190 0.788 | 2.140 0.838 | 2.090 0.888 | 2.040 0.938 | 1.990 0.988 | 1.940 1.038 | 1.890 1.088 | 1.840 1.138 | 1.790 1.188 | 1.740 1.238 | 1.690 1.288 | 1.640 1.338 | 1.590 1.388 |
| Avg 25B | -0.032 | 2.325 0.493 | 2.275 0.543 | 2.225 0.593 | 2.175 -0.643 | 2.125 0.693 | 2.075 0.743 | 2.025 0.793 | 1.975 0.843 | 1.925 0.893 | 1.875 0.943 | 1.825 0.993 | 1.775 1.043 | 1.725 1.093 | 1.675 1.143 | 1.625 1.193 | 1.575 1.243 | 1.525 1.293 |
| Avg 26B | -0.169 | 1.712 -0.257 | 1.662 -0.207 | 1.612 -0.157 | 1.562 -0.107 | 1.512 -0.057 | 1.462 -0.007 | 1.412 0.043 | 1.362 0.093 | 1.312 0.143 | 1.262 0.193 | 1.212 0.243 | 1.162 0.293 | 1.112 0.343 | 1.062 0.393 | 0.012 0.443 | 0.962 0.493 | 0.912 0.543 |
| Avg 27A | 0.120 | 2.149 0.468 | 2.099 0.518 | 2.049 0.568 | 1.999 0.618 | 1.949 0.668 | 1.899 0.718 | 1.849 0.768 | 1.799 0.818 | 1.749 0.868 | 1.699 0.918 | 1.649 0.968 | 1.599 1.018 | 1.549 1.068 | 1.499 1.118 | 1.449 1.168 | 1.399 1.218 | 1.349 1.268 |
| Avg 28C | 0.178 | 2.007 0.385 | 1.957 0.435 | 1.907 0.485 | 1.857 0.535 | 1.807 0.585 | 1.757 0.635 | 1.707 0.685 | 1.657 0.735 | 1.607 0.785 | 1.557 0.835 | 1.507 0.885 | 1.457 0.935 | 1.407 0.985 | 1.357 1.035 | 1.307 1.085 | 1.257 1.135 | 1.207 1.185 |
| Avg 29C | -0.129 | 2.471 0.542 | 2.421 0.592 | 2.371 0.642 | 2.321 0.692 | 2.271 0.742 | 2.221 0.792 | 2.171 0.842 | 2.121 0.892 | 2.071 0.942 | 2.021 0.992 | 1.971 1.042 | 1.921 1.092 | 1.871 1.142 | 1.821 1.192 | 1.771 1.242 | 1.721 1.292 | 1.671 1.342 |
| Avg 30B | 0.032 | 2.073 0.304 | 2.023 0.354 | 1.973 0.404 | 1.923 0.454 | 1.873 0.504 | 1.823 0.554 | 1.773 0.604 | 1.723 0.654 | 1.673 0.704 | 1.623 0.754 | 1.573 0.804 | 1.523 0.854 | 1.473 0.904 | 1.423 0.954 | 1.373 1.004 | 1.323 1.054 | 1.273 1.104 |
| Avg 31C | -0.174 | 2.011 0.037 | 1.961 0.087 | 1.911 0.137 | 1.861 0.187 | 1.811 0.237 | 1.761 0.287 | 1.711 0.337 | 1.661 0.387 | 1.611 0.437 | 1.561 0.487 | 1.511 0.537 | 1.461 0.587 | 1.411 0.637 | 1.361 0.687 | 1.311 0.737 | 1.261 0.787 | 1.211 0.837 |
| Avg 32C | -0.015 | 2.285 0.470 | 2.235 0.520 | 2.185 0.570 | 2.135 0.620 | 2.085 0.670 | 2.035 0.720 | 1.985 0.770 | 1.935 0.820 | 1.885 0.870 | 1.835 0.920 | 1.785 0.970 | 1.735 1.020 | 1.685 1.070 | 1.635 1.120 | 1.585 1.170 | 1.535 1.220 | 1.485 1.270 |
| Avg 33C | -0.080 | 2.218 0.338 | 2.168 0.388 | 2.118 0.438 | 2.068 0.488 | 2.018 0.538 | 1.968 0.588 | 1.918 0.638 | 1.868 0.688 | 1.818 0.738 | 1.768 0.788 | 1.718 0.838 | 1.668 0.888 | 1.618 0.938 | 1.568 0.988 | 1.518 1.038 | 1.468 1.088 | 1.418 1.138 |
| Avg 34A | -0.209 | 1.755 -0.255 | 1.705 -0.205 | 1.655 -0.155 | 1.605 -0.105 | 1.555 -0.055 | 1.505 -0.005 | 1.455 0.045 | 1.405 0.095 | 1.355 0.145 | 1.305 0.195 | 1.255 0.245 | 1.205 0.295 | 1.155 0.345 | 1.105 0.395 | 1.055 0.445 | 1.005 0.495 | 0.955 0.545 |
| Avg 35C | -0.083 | 2.260 0.377 | 2.210 0.427 | 2.160 0.477 | 2.110 0.527 | 2.060 0.577 | 2.010 0.627 | 1.960 0.677 | 1.910 0.727 | 1.860 0.777 | 1.810 0.827 | 1.760 0.877 | 1.710 0.927 | 1.660 0.977 | 1.610 1.027 | 1.560 1.077 | 1.510 1.127 | 1.460 1.177 |
| Avg 36B | -0.212 | 2.396 0.384 | 2.346 0.434 | 2.296 0.484 | 2.246 0.534 | 2.196 0.584 | 2.146 0.634 | 2.096 0.684 | 2.046 0.734 | 1.996 0.784 | 1.946 0.834 | 1.896 0.884 | 1.846 0.934 | 1.796 0.984 | 1.746 1.034 | 1.696 1.084 | 1.646 1.134 | 1.596 1.184 |
| Avg 37C | 0.015 | 2.249 0.463 | 2.199 0.513 | 2.149 0.563 | 2.099 0.613 | 2.049 0.663 | 1.999 0.713 | 1.949 0.763 | 1.899 0.813 | 1.849 0.863 | 1.799 0.913 | 1.749 0.963 | 1.699 1.013 | 1.649 1.063 | 1.599 1.113 | 1.549 1.163 | 1.499 1.213 | 1.449 1.263 |
| Avg 38B | 0.003 | 1.841 0.044 | 1.791 0.094 | 1.741 0.144 | 1.691 0.194 | 1.641 0.244 | 1.591 0.294 | 1.541 0.344 | 1.491 0.394 | 1.441 0.444 | 1.391 0.494 | 1.341 0.544 | 1.291 0.594 | 1.241 0.644 | 1.191 0.694 | 1.141 0.744 | 1.091 0.794 | 1.041 0.844 |

FIG. 13C

| === I data === | 0 dB === | Group 1 | | | | | Average I Values ↓ | | | | | | | | | |
|---|---|---|---|---|---|---|---|---|---|---|---|---|---|---|---|---|
| -.05 V | 0 V | .05 V | .1 V | .15 V | .2 V | .25 V | .3 V | .35 V | .4 V | .45 V | .5 V | .55 V | .6 V | .65 V | .7 V | .75 V |
| 1.581 1.522 | 1.531 1.572 | 1.481 1.622 | 1.431 1.672 | 1.381 1.722 | 1.331 1.772 | 1.281 1.822 | 1.231 1.872 | 1.181 1.922 | 1.131 1.972 | 1.081 2.022 | 1.031 2.072 | 0.981 2.122 | 0.931 2.172 | 0.861 2.222 | 0.831 2.272 | 0.781 2.322 |
| 1.066 0.914 | 1.016 0.964 | 0.966 1.014 | 0.916 1.064 | 0.866 1.114 | 0.816 1.164 | 0.766 1.214 | 0.716 1.264 | 0.666 1.314 | 1.616 1.364 | 0.566 1.414 | 0.516 1.464 | 0.466 1.514 | 0.416 1.564 | 0.366 1.614 | 0.316 1.664 | 0.266 1.714 |
| 1.110 1.070 | 1.060 1.120 | 1.010 1.170 | 0.960 1.220 | 0.910 1.270 | 0.860 1.320 | 0.810 1.370 | 0.760 1.420 | 0.710 1.470 | 0.660 1.520 | 0.610 1.570 | 0.560 1.620 | 0.510 1.670 | 0.460 1.720 | 0.410 1.770 | 0.360 1.820 | 0.310 1.870 |
| 1.028 0.951 | 0.978 1.001 | 0.928 1.051 | 0.878 1.101 | 0.828 1.151 | 0.778 1.201 | 0.728 1.251 | 0.678 1.301 | 0.628 1.351 | 0.578 1.401 | 0.528 1.451 | 0.478 1.501 | 0.428 1.551 | 0.378 1.601 | 0.328 1.651 | 0.278 1.701 | 0.228 1.751 |
| 1.540 1.438 | 1.490 1.488 | 1.440 1.538 | 1.390 1.588 | 1.340 1.638 | 1.290 1.688 | 1.240 1.738 | 1.190 1.788 | 1.140 1.838 | 1.090 1.888 | 1.040 1.938 | 0.990 1.988 | 0.940 2.038 | 0.890 2.088 | 0.840 2.138 | 0.790 2.188 | 0.740 2.238 |
| 1.475 1.343 | 1.425 1.393 | 1.375 1.443 | 1.325 1.493 | 1.275 1.543 | 1.225 1.593 | 1.175 1.643 | 1.125 1.693 | 1.075 1.743 | 1.025 1.793 | 0.975 1.843 | 0.925 1.893 | 0.875 1.943 | 0.825 1.993 | 0.775 2.043 | 0.725 2.093 | 0.675 2.143 |
| 0.862 0.593 | 0.812 0.643 | 0.762 0.693 | 0.712 0.743 | 0.662 0.793 | 0.612 0.843 | 0.562 0.893 | 0.512 0.943 | 0.462 0.993 | 0.412 1.043 | 0.362 1.093 | 0.312 1.143 | 0.262 1.193 | 0.212 1.243 | 0.162 1.293 | 0.112 1.343 | 0.062 1.393 |
| 1.299 1.318 | 1.249 1.368 | 1.199 1.418 | 1.149 1.468 | 1.093 1.518 | 1.049 1.568 | 0.999 1.618 | 0.949 1.668 | 0.899 1.718 | 0.849 1.768 | 0.799 1.818 | 0.749 1.868 | 0.699 1.918 | 0.649 1.968 | 0.599 2.018 | 0.549 2.068 | 0.499 2.118 |
| 1.157 1.235 | 1.107 1.285 | 1.057 1.335 | 1.007 1.385 | 0.957 1.435 | 0.907 1.485 | 0.857 1.535 | 0.807 1.585 | 0.757 1.635 | 0.707 1.685 | 0.657 1.735 | 0.607 1.785 | 0.557 1.835 | 0.507 1.885 | 0.457 1.935 | 0.407 1.985 | 0.357 2.035 |
| 1.621 1.392 | 1.571 1.442 | 1.521 1.492 | 1.471 1.542 | 1.421 1.592 | 1.371 1.642 | 1.321 1.692 | 1.271 1.742 | 1.221 1.792 | 1.171 1.842 | 1.121 1.892 | 1.071 1.942 | 1.021 1.992 | 0.971 2.042 | 0.921 2.092 | 0.871 2.142 | 0.821 2.192 |
| 1.223 1.154 | 1.173 1.204 | 1.123 1.254 | 1.073 1.304 | 1.023 1.354 | 0.973 1.404 | 0.923 1.454 | 0.873 1.504 | 0.823 1.554 | 0.773 1.604 | 0.723 1.654 | 0.673 1.704 | 0.623 1.754 | 0.573 1.804 | 0.523 1.854 | 0.473 1.904 | 0.423 1.954 |
| 1.161 0.887 | 1.111 0.937 | 1.061 0.987 | 1.011 1.037 | 0.961 1.087 | 0.911 1.137 | 0.861 1.187 | 0.811 1.237 | 0.761 1.287 | 0.711 1.337 | 0.661 1.387 | 0.611 1.437 | 0.561 1.487 | 0.511 1.537 | 0.461 1.587 | 0.411 1.637 | 0.361 1.687 |
| 1.435 1.320 | 1.385 1.370 | 1.335 1.420 | 1.285 1.470 | 1.235 1.520 | 1.185 1.570 | 1.135 1.620 | 1.085 1.670 | 1.035 1.720 | 0.985 1.770 | 0.935 1.820 | 0.885 1.870 | 0.835 1.920 | 0.785 1.970 | 0.735 2.020 | 0.685 2.070 | 0.635 2.120 |
| 1.368 1.188 | 1.318 1.238 | 1.268 1.288 | 1.218 1.338 | 1.168 1.388 | 1.118 1.438 | 1.068 1.488 | 1.018 1.538 | 0.968 1.588 | 0.918 1.638 | 0.868 1.688 | 0.818 1.738 | 0.768 1.788 | 0.718 1.838 | 0.668 1.888 | 0.618 1.938 | 0.568 1.988 |
| 0.905 0.595 | 0.855 0.645 | 0.805 0.695 | 0.755 0.745 | 0.705 0.795 | 0.655 0.845 | 0.605 0.895 | 0.555 0.945 | 0.505 0.995 | 0.455 1.045 | 0.405 1.095 | 0.355 1.145 | 0.305 1.195 | 0.255 1.245 | 0.205 1.295 | 0.155 1.345 | 0.105 1.395 |
| 1.410 1.227 | 1.360 1.277 | 1.310 1.327 | 1.260 1.377 | 1.210 1.427 | 1.160 1.477 | 1.110 1.527 | 1.060 1.577 | 1.010 1.627 | 0.960 1.677 | 0.910 1.727 | 0.860 1.777 | 0.810 1.827 | 0.760 1.877 | 0.710 1.927 | 0.660 1.977 | 0.610 2.027 |
| 1.546 1.234 | 1.496 1.284 | 1.446 1.334 | 1.396 1.384 | 1.346 1.434 | 1.296 1.484 | 1.246 1.534 | 1.196 1.584 | 1.146 1.634 | 1.096 1.684 | 1.046 1.734 | 0.996 1.784 | 0.946 1.834 | 0.896 1.884 | 0.846 1.934 | 0.796 1.984 | 0.746 2.034 |
| 1.399 1.313 | 1.349 1.363 | 1.299 1.413 | 1.249 1.463 | 1.199 1.513 | 1.149 1.563 | 1.099 1.613 | 1.049 1.663 | 0.999 1.713 | 0.949 1.763 | 0.899 1.813 | 0.849 1.863 | 0.799 1.913 | 0.749 1.963 | 0.699 2.013 | 0.649 2.063 | 0.599 2.113 |
| 0.991 0.894 | 0.941 0.944 | 0.891 0.994 | 0.841 1.044 | 0.791 1.094 | 0.741 1.144 | 0.691 1.194 | 0.641 1.244 | 0.591 1.294 | 0.541 1.344 | 0.491 1.394 | 0.441 1.444 | 0.391 1.494 | 0.341 1.544 | 0.291 1.594 | 0.241 1.644 | 0.191 1.694 |

RANDOM 1 data

| Trial Group | Orig Noise Avg | New Noise Average | | | | | Equiv Voltage Added | Last Noise Avg | Ratio Orig Last |
|---|---|---|---|---|---|---|---|---|---|
| | | 1 | 2 | 3 | 4 | 5 | | | |
| 205 1 | 0.1481 | 0.0686 | -0.1814 | 0.0686 | -0.0564 | 0.0061 | -0.1233 | -0.0252 | 5.9 |
| 205 2 | 0.5426 | 0.3662 | 0.1162 | -0.1338 | -0.0088 | 0.0532 | -0.5201 | 0.0225 | -4.1 |
| 205 3 | 0.6213 | 0.5002 | 0.2502 | 0.0002 | -0.1248 | -0.0623 | -0.6524 | -0.0311 | 20.0 |
| 206 1 | -0.2508 | -0.0508 | 0.1992 | -0.0508 | 0.0942 | 0.0117 | 0.2313 | -0.0196 | 12.8 |
| 206 2 | 0.1813 | -0.1142 | 0.1358 | -0.1142 | 0.0108 | -0.0517 | -0.2017 | -0.0205 | 8.9 |
| 206 3 | -0.4060 | 0.3165 | -0.0565 | 0.1835 | 0.0585 | -0.0040 | 0.4332 | 0.0272 | 14.9 |
| 207 1 | -0.2893 | -0.0300 | 0.2200 | -0.0800 | 0.0950 | 0.0825 | 0.2906 | 0.0013 | 223.5 |
| 207 2 | -0.0591 | 0.1268 | -0.1232 | 0.1266 | 0.0018 | -0.0602 | 0.0296 | -0.0295 | 2.0 |
| 207 3 | 0.8016 | 0.7904 | 0.5404 | 0.2904 | 0.1654 | 0.1029 | -0.7300 | 0.0716 | 11.2 |
| 208 1 | -0.3269 | -0.1255 | 0.1245 | -0.1255 | -0.0005 | 0.0620 | 0.3577 | 0.0308 | 10.6 |
| 208 2 | -0.5892 | -0.4528 | -0.2026 | 0.0472 | -0.0778 | -0.0153 | 0.6052 | 0.0160 | 36.9 |
| 208 3 | -0.5162 | -0.3509 | -0.1009 | 0.1491 | 0.0241 | -0.0884 | 0.5090 | -0.0071 | 72.4 |
| 209 1 | -0.3328 | -0.2315 | 0.0185 | -0.2315 | -0.1065 | -0.0440 | 0.8200 | -0.0128 | 26.1 |
| 209 2 | 0.7883 | 0.6286 | 0.3786 | 0.1286 | 0.0036 | -0.0589 | -0.8160 | -0.0277 | 28.5 |
| 209 3 | -0.3146 | -0.1996 | 0.0504 | -0.1996 | -0.0746 | -0.0121 | 0.3338 | 0.0192 | 16.4 |
| 210 1 | -0.4353 | -0.2432 | 0.0066 | -0.2432 | -0.1182 | -0.0557 | 0.4109 | -0.0244 | 17.8 |
| 210 2 | -0.1066 | 0.1332 | -0.1168 | 0.1332 | 0.0082 | -0.0543 | 0.0836 | -0.0230 | 4.8 |
| 210 3 | 0.2597 | 0.0257 | -0.2246 | 0.0257 | -0.0993 | -0.0366 | -0.2652 | -0.0055 | 46.9 |
| 211 1 | -0.2477 | -0.0226 | 0.2280 | -0.0220 | 0.1030 | 0.0405 | 0.2569 | 0.0093 | 26.7 |
| 211 2 | -0.2277 | -0.2138 | 0.0362 | -0.2138 | -0.0888 | -0.0263 | 0.2827 | 0.0049 | 46.0 |
| 211 3 | 0.6775 | 0.5916 | 0.3446 | 0.0948 | -0.0304 | 0.0321 | -0.6767 | 0.0008 | 820.7 |
| 212 1 | 0.1145 | -0.2323 | 0.0122 | -0.2323 | -0.1073 | -0.0446 | -0.1280 | -0.0138 | 8.4 |
| 212 2 | 0.3209 | 0.2503 | 0.0003 | -0.2497 | -0.1247 | -0.0622 | -0.3518 | -0.0309 | 10.4 |
| 212 3 | 0.2695 | 0.2159 | -0.0341 | 0.2159 | 0.0909 | 0.0284 | -0.2624 | -0.0029 | 90.1 |
| 213 1 | 0.4217 | 0.2221 | -0.0279 | 0.2221 | 0.0971 | 0.0846 | 0.4183 | 0.0034 | 123.8 |
| 213 2 | -0.5357 | -0.3012 | -0.0512 | 0.1988 | 0.0738 | 0.0116 | 0.5167 | -0.0199 | 26.9 |
| 213 3 | -0.2945 | -0.2948 | -0.0248 | 0.2232 | 0.1002 | 0.0557 | 0.3008 | 0.0065 | 48.8 |
| 214 1 | -0.6983 | -0.5029 | -0.2529 | -0.0029 | 0.1221 | 0.0596 | 0.7267 | 0.0288 | 24.6 |
| 214 2 | 07664 | 0.7016 | 0.4516 | 0.2016 | 0.0766 | 0.0141 | -0.7836 | -0.0171 | 44.9 |
| 214 3 | 0.3609 | 0.2281 | -0.0219 | 0.2281 | 0.1031 | 0.0406 | -0.3516 | 0.0098 | 38.9 |
| 215 1 | -0.5990 | -0.3920 | -0.1420 | 0.1080 | -0.0170 | 0.0455 | 0.6132 | 0.0142 | 42.1 |
| 215 2 | -0.6418 | -0.6169 | -0.3669 | -0.1169 | 0.0081 | -0.0544 | 0.6187 | -0.0231 | 27.8 |
| 215 3 | -0.2020 | -0.0166 | 0.2334 | -0.0166 | 0.1084 | 0.0459 | 0.2166 | 0.0146 | 13.8 |
| 216 1 | 0.2267 | -0.0009 | 0.2491 | -0.0009 | 0.1241 | 0.0616 | -0.1964 | 0.0303 | 7.5 |
| 216 2 | -0.7869 | -0.7607 | -0.5107 | -0.2607 | -0.1357 | -0.0732 | 0.9450 | -0.0419 | 18.8 |
| 216 3 | -0.3518 | -0.0994 | 0.1506 | -0.0994 | 0.0256 | -0.0369 | 0.3462 | -0.0057 | 61.9 |
| 217 1 | -0.3168 | -0.0968 | 0.1532 | -0.0968 | 0.0282 | -0.0343 | 0.3138 | -0.0031 | 103.9 |
| 217 2 | 0.3848 | 0.3126 | 0.0626 | -0.1874 | -0.0624 | 0.0001 | -0.4160 | -0.0312 | 12.3 |
| 217 3 | 0.3492 | 0.2517 | 0.0017 | -0.2483 | -0.1233 | -0.0608 | -0.3788 | -0.0296 | 11.8 |
| 218 1 | 0.2194 | 0.0254 | -0.2246 | 0.0254 | -0.0996 | -0.0371 | -0.2253 | -0.0059 | 37.2 |
| 218 2 | -0.6434 | -0.5998 | -0.3498 | -0.0998 | 0.0252 | -0.0373 | 0.6393 | -0.0061 | 106.0 |
| 218 3 | 0.2516 | 0.1355 | -0.1145 | 0.1855 | 0.0105 | -0.0520 | -0.2724 | -0.0207 | 12.1 |
| 219 1 | -0.8197 | -0.5113 | -0.2613 | -0.0113 | 0.1139 | 0.0612 | 0.8396 | 0.0200 | 41.1 |
| 219 2 | -0.1859 | 0.0141 | -0.2359 | 0.0141 | -0.1109 | -0.0484 | 0.1688 | -0.0172 | 10.8 |
| 219 3 | -0.2779 | -0.1231 | 0.1269 | -0.1231 | 0.0019 | -0.0608 | 0.2486 | -0.0294 | 9.5 |
| 220 1 | -0.2296 | -0.0756 | 0.1944 | -0.0956 | 0.0494 | -0.0181 | 0.2477 | 0.0181 | -12.7 |
| 220 2 | -0.2729 | -0.1909 | 0.0991 | -0.1909 | -0.0439 | 0.0186 | 0.2582 | -0.0146 | 18:6 |
| 220 3 | -0.0854 | -0.0404 | 0.2098 | -0.0404 | 0.0848 | 0.0221 | 0.0963 | -0.0091 | 9.4 |
| 221 1 | -0.3921 | -0.2118 | 0.0882 | -0.2118 | -0.0883 | -0.0248 | 0.3990 | 0.0069 | 58.8 |
| 221 2 | 0.8987 | 0.7852 | 0.8852 | 0.2852 | 0.1602 | 0.0423 | -0.8323 | 0.0664 | 13.8 |
| 221 3 | -0.3528 | -0.3370 | 0.0870 | 0.1680 | 0.0880 | -0.0243 | 0.8556 | 0.0068 | 52.0 |

FIG. 14A

RANDOM Q data

| Trial Group | Orig Noise Avg | New Noise Average | | | | | Equiv Voltage Added | Last Noise Avg | Ratio Orig Last |
|---|---|---|---|---|---|---|---|---|---|
| | | 1 | 2 | 3 | 4 | 5 | | | |
| 205 1 | 0.4440 | 0.3970 | 0.1470 | -0.1030 | 0.0220 | -0.0405 | -0.4532 | -0.0092 | 48.1 |
| 205 2 | 0.1928 | 0.0077 | -0.2423 | 0.0077 | -0.1173 | -0.0548 | -0.2163 | -0.0235 | 8.2 |
| 205 3 | 0.2307 | 0.0307 | -0.2198 | 0.0507 | -0.0943 | -0.0318 | -0.2313 | -0.0006 | 392.9 |
| 206 1 | 0.6667 | 0.5649 | 0.3149 | 0.0649 | -0.0601 | 0.0024 | -0.6955 | -0.0288 | 23.1 |
| 206 2 | -0.0969 | 0.1153 | -0.1347 | 0.1158 | -0.0097 | 0.0528 | 0.1174 | 0.0215 | 4.5 |
| 206 3 | 0.0218 | -0.2565 | -0.0065 | 0.2435 | 0.1185 | 0.0560 | 0.0030 | 0.0248 | 0.9 |
| 207 1 | 0.7412 | 0.7194 | 0.4694 | 0.2194 | 0.0944 | 0.0319 | -0.7406 | 0.0006 | 1181.1 |
| 207 2 | -0.2973 | -0.2522 | -0.0022 | 0.2478 | 0.1228 | 0.0603 | 0.3263 | 0.0290 | 10.2 |
| 207 3 | 0.3831 | -0.0517 | 0.1983 | -0.0517 | 0.0733 | 0.0108 | -0.4036 | -0.0205 | 18.7 |
| 208 1 | 0.2199 | 0.1728 | -0.0772 | 0.1728 | 0.0478 | -0.0147 | -0.2033 | 0.0166 | 13.3 |
| 208 2 | 0.4198 | 0.3966 | 0.1466 | -0.1034 | 0.0216 | -0.0409 | -0.4295 | -0.0097 | 43.4 |
| 208 3 | -0.1523 | -0.0900 | 0.1600 | -0.0900 | 0.0350 | -0.0275 | 0.1561 | 0.0038 | 40.1 |
| 209 1 | -0.3033 | -0.2685 | -0.0185 | 0.2315 | 0.1065 | 0.0440 | 0.3161 | 0.0127 | 23.8 |
| 209 2 | -0.0808 | 0.0528 | -0.1972 | 0.0528 | -0.0722 | -0.0097 | 0.1024 | 0.0216 | 3.7 |
| 209 3 | -0.0148 | 0.1385 | -0.1115 | 0.1385 | 0.0135 | -0.0490 | -0.0029 | -0.0177 | 0.8 |
| 210 1 | 0.2507 | 0.1607 | -0.0893 | 0.1607 | 0.0357 | -0.0268 | -0.2462 | 0.0044 | 56.8 |
| 210 2 | 0.2427 | 0.2049 | -0.0451 | 0.2049 | 0.0799 | 0.0174 | -0.2566 | -0.0139 | 17.5 |
| 210 3 | 0.0961 | -0.0761 | 0.1739 | -0.0761 | 0.0489 | -0.0136 | -0.0784 | 0.0177 | 5.4 |
| 211 1 | 0.2869 | 0.2232 | -0.0268 | 0.2232 | 0.0982 | 0.0357 | -0.2325 | 0.0044 | 53.5 |
| 211 2 | 0.4865 | 0.2534 | 0.0034 | -0.2456 | -0.1216 | -0.0591 | -0.5143 | -0.0278 | 17.5 |
| 211 3 | -0.7412 | -0.7089 | -0.4589 | -0.2039 | -0.0789 | -0.0164 | 0.7560 | 0.0148 | 50.1 |
| 212 1 | 0.5285 | 0.3926 | 0.1426 | -0.1074 | 0.0176 | -0.0449 | -0.5421 | -0.0136 | 38.8 |
| 212 2 | 0.1817 | 0.0830 | -0.1679 | 0.0830 | -0.0420 | 0.0205 | -0.1925 | -0.0107 | 16.9 |
| 212 3 | -0.0208 | 0.1420 | -0.1080 | 0.1420 | 0.0170 | -0.0455 | 0.0066 | -0.0142 | 1.5 |
| 213 1 | -0.2570 | -0.1652 | 0.0848 | -0.1652 | -0.0402 | 0.0223 | 0.2480 | -0.0090 | 28.7 |
| 213 2 | -0.0064 | 0.0310 | -0.2190 | 0.0310 | -0.0940 | -0.0315 | 0.0062 | -0.0003 | 24.3 |
| 213 3 | -0.5096 | -0.3200 | -0.0700 | 0.1800 | 0.0550 | -0.0075 | 0.5333 | 0.0237 | 21.5 |
| 214 1 | -0.0246 | 0.1703 | -0.0797 | 0.1703 | 0.0453 | -0.0172 | 0.0387 | 0.0141 | 1.8 |
| 214 2 | -0.1596 | -0.0912 | 0.1586 | -0.0912 | 0.0338 | -0.0287 | 0.1620 | 0.0025 | 62.8 |
| 214 3 | 0.1216 | -0.0494 | 0.2006 | -0.0494 | 0.0756 | 0.0131 | -0.1398 | -0.0181 | 6.7 |
| 215 1 | -0.3403 | -0.0218 | 0.2287 | -0.0213 | 0.1037 | 0.0412 | 0.3502 | 0.0099 | 34.3 |
| 215 2 | -0.1557 | -0.0243 | 0.2257 | -0.0243 | 0.1007 | 0.0382 | 0.1627 | 0.0069 | 22.4 |
| 215 3 | -0.5943 | -0.3037 | -0.0537 | 0.1963 | 0.0713 | 0.0088 | 0.5718 | -0.0225 | 26.5 |
| 216 1 | 0.1581 | 0.0282 | -0.2218 | 0.0282 | -0.0968 | -0.0343 | -0.1614 | -0.0030 | 52.0 |
| 216 2 | 0.3981 | 0.3794 | 0.1294 | -0.1206 | 0.0044 | -0.0581 | -0.4250 | -0.0268 | 14.8 |
| 216 3 | 0.1159 | -0.0841 | 0.1659 | -0.0841 | 0.0409 | -0.0216 | -0.1063 | 0.0097 | 12.0 |
| 217 1 | 0.4497 | 0.2497 | -0.0003 | 0.2497 | 0.1247 | 0.0622 | -0.4188 | 0.0309 | 14.5 |
| 217 2 | 0.5273 | 0.2169 | -0.0331 | 0.2169 | 0.0919 | 0.0294 | -0.5292 | -0.0019 | 278.7 |
| 217 3 | 0.1066 | -0.0700 | 0.1800 | -0.0700 | 0.0550 | -0.0075 | -0.0829 | 0.0238 | 4.5 |
| 218 1 | -0.4485 | -0.2822 | -0.0322 | 0.2178 | 0.0928 | 0.0303 | 0.4475 | -0.0010 | 453.7 |
| 218 2 | 0.0983 | -0.1447 | 0.1058 | -0.1447 | -0.0197 | 0.0428 | -0.0867 | 0.0115 | 8.5 |
| 218 3 | 0.0171 | -0.1190 | 0.1310 | -0.1190 | 0.0060 | -0.0565 | -0.0423 | -0.0252 | 0.7 |
| 219 1 | 0.0508 | -0.1111 | 0.1389 | -0.1111 | 0.0139 | -0.0486 | -0.0681 | -0.0173 | 2.9 |
| 219 2 | 0.2668 | 0.0668 | -0.1882 | 0.0668 | -0.0582 | 0.0043 | -0.2938 | -0.0270 | 9.9 |
| 219 3 | -0.2792 | -0.1891 | 0.0609 | -0.1891 | -0.0641 | -0.0016 | 0.3088 | 0.0296 | 9.4 |
| 220 1 | 0.6507 | 0.6095 | 0.3595 | 0.1095 | -0.0155 | 0.0470 | -0.6349 | 0.0158 | 41.2 |
| 220 2 | 0.6336 | 0.3617 | 0.1112 | -0.1383 | -0.0133 | 0.0492 | -0.6157 | 0.0179 | 35.4 |
| 220 3 | -0.1340 | 0.1748 | -0.0752 | 0.1748 | 0.0498 | -0.0127 | 0.1525 | 0.0185 | 7.2 |
| 221 1 | -0.3141 | -0.1141 | 0.1359 | -0.1141 | 0.0109 | -0.0516 | 0.2938 | -0.0204 | 15.4 |
| 221 2 | -0.0350 | 0.1447 | -0.1056 | 0.1447 | 0.0197 | -0.0428 | 0.0235 | -0.0116 | 3.0 |
| 221 3 | 0.1035 | -0.1367 | 0.1144 | -0.1367 | 0.0117 | 0.0508 | -0.0839 | 0.0196 | 5.3 |

FIG. 14B

Illustration of Comparative Improvement

RECEIVING SYSTEM WITH IMPROVED DIRECTIVITY AND SIGNAL TO NOISE RATIO

CROSS REFERENCE TO RELATED APPLICATIONS

This application is filed under 35 U.S.C. § 111(a), claiming benefit pursuant to 35 U.S.C. § 119(e)(1) of the filing date of the Provisional Application 60/110,695 filed on Dec. 3, 1998 pursuant to 35 U.S.C. § 111(b). The Provisional Application is incorporated herein by reference for all it discloses.

BACKGROUND OF THE INVENTION

This invention relates to a unique receiver system which enhances the directivity of an incoming beam and improves the Signal-to-Noise ratio of received signals, compared to conventional receiver techniques, and which processes stored received data from an antenna to achieve enhanced directivity and improved Signal-to-Noise characteristics. The invention includes a specific antenna configuration interwoven with a special processing scheme. The invention provides dramatic improvement in the performance of a receiving system and affords greater flexibility with respect to several relevant parameters, such as frequency and antenna size and configuration. The invention is beneficial in various applications that utilize receiving systems. Accordingly, the invention is beneficial in a wide range of commercial and military applications. For example, the noise reduction aspect of the invention is applicable to improving the Signal to Noise ratio (S/N) in wired systems as well as in wireless systems. As such, the invention is applicable to a variety of wireless and wireline telecommunications media applications and other wireless systems, including radar.

In typical radar configurations, a common antenna is used for both transmitting and receiving, and the "transmit" and "receive" beams have essentially the same characteristics. In accordance with the present invention, the transmitter beam would not be narrowed and would distribute its power over a solid angle encompassing either a single, or a multiplicity (cluster), of beams. The equivalent power density per narrowed "receive" beam, in accordance with the invention, is the same as in the original beam, but the effective gain of the narrowed receive beam provides overall enhancement.

It is well established that the characteristics of an antenna used in wireless receiving systems are determined largely by the physical size of the antenna measured in wavelengths of the operating frequency of the system. The horizontal and vertical dimensions (in wavelengths) of the antenna aperture determine the "half power width" of the antenna pattern, or "beamwidth", in each direction. As a consequence, a given available aperture, i.e., "effective antenna" area, dictates the use of shorter wavelengths to obtain proportionately smaller beamwidths and, hence, improvement in directivity of the overall system. Directivity refers to the ability of the receive system to distinguish between signals received from the same general direction. If, for example, the beamwidth of the receive system was narrowed sufficiently, the ability to resolve closely spaced signals would be improved.

The configuration of an antenna can take a variety of geometric forms. For instance, an antenna can be made up of a number of "dipole" radiating elements, each of which receives the signal. A collection of received signals from each element is combined resulting in a final receive signal with a respective overall beamwidth. The beam is then directed, or scanned, in a desired direction to receive signals from, ideally, that particular direction only. As the beam is scanned in other directions, signals from those directions can be distinguished from signals received from the previously scanned directions. However, a problem of interference arises when signals from outside the intended direction of the beam are received and these interference signals cannot be resolved from the signals received from the intended direction. This problem is due mainly to the inability of the given antenna aperture to create a beamwidth narrow enough to distinguish between closely spaced signals.

Further, as each of the individual receive signals is collected from the respective antenna elements, it is typically necessary to amplify the signals to provide sufficient signal strength for subsequent signal processing. Accordingly, in many applications the signal received from each element can be amplified by the use of an associated "preamplifier" having a state-of-the-art "noise figure" to improve the S/N ratio at the beginning, or input, of the system. Under these circumstances, as well as in normal circumstances, this input noise becomes the principal source of noise and establishes the S/N ratio from each element. Enough amplification is typically introduced to provide a signal level appropriate for subsequent processing in the overall system. When the ratio of the signal level as compared to the associated noise level for each receive element is maximized, it becomes easier to distinguish between low-level received signals and the respective noise associated with each received signal. The ability to resolve low-level signals from the noise imparts improved "detectability" and resolution to the overall receive system and is desired in all receive systems.

Therefore, it is desired to raise the S/N ratio as high as possible and at the same time narrow the beamwidth of the antenna in order to distinguish between signals in close proximity from each other and to distinguish signals with low power levels from the noise.

SUMMARY OF THE INVENTION

It is, therefore, an object of the present invention to provide an improved receive system that provides the ability to distinguish between signals existing in close proximity from each other (in elevation and/or azimuth) by providing an antenna with a narrow beamwidth and, simultaneously, providing the ability to distinguish between signals with low power levels from their associated noise by substantially increasing the S/N ratio of the system.

Another object of the present invention is to provide a unique antenna configuration with a given antenna aperture, or size, that provides the same performance as an antenna with a larger aperture.

A further object of the present invention is to provide a unique antenna configuration that can accommodate a wide range of operating frequencies and where the antenna can be either fixed or moveable.

A further object of the present invention is to provide a phase reference for the receiver system to permit formation of I and Q components which are processed separately.

A further object of the present invention is to provide a digital processing method which can be carried out in software.

A further object of the present invention is to provide a receive system whereby received signals are sampled periodically and the noise component of the overall received signal sample is separated from the overall received signal sample leaving a noiseless sample of the received signal.

A further object of the present invention is to provide a method for near-real-time iterative processing which is performed offline with respect to data retrieval using a number of iterative steps.

A further object of the present invention is to provide a "polarity change" sensing means, also referred to herein as a Topographical Change Sensor (TCS), appropriate for executing the several steps of the noise reducing iterative process.

A further object of the present invention is to provide an iterative sequence programmer that provides, in "near real-time," an appropriate control of value steps, and responses to sensed changes that occur in the TCS.

A further object of the present invention is to provide a unique antenna configuration whereby a number (i.e., 2 or more) groups of signals are formed, each at different phase multiples of each other enhancing the ability to separate, i.e., resolve, signals with different arrival angles.

A further object of the present invention is to provide noise reduced I and Q signals, the angle of which is the arctangent of Q divided by I for each of 2 or more groups that have the same phase multiples.

A further object of the present invention is a description of a phase gate analogy as a means of defining the realization of the resolution function and its criteria.

A still further object of the present invention is to provide a series of simultaneous phase multiplications of the arctangent of Q divided by I to form a sharpened receive beam.

A still further object of the present invention is to provide for the sharpened beams (from the "effectively larger aperture") to be electronically steered in angular directions by the introduction of appropriate phase shifts applied within the system.

An even further object of the present invention is to provide a "cluster" or "pincushion" of sharpened beams formed from an array of real elements. The cluster being contained within the normal unenhanced beam and facilitating coverage of an angular sector as an alternative to searching with a single sharp beam.

To achieve the above and other objects of the present invention the following embodiments are provided as examples of the invention. Persons skilled in the art would be aware of techniques available to modify various elements of the invention without straying from the scope and spirit of the invention.

In accordance with the above objects, one embodiment of the present invention provides an array antenna comprising a modest number of radiating/receiving elements (about 20–30). Each element receives a respective portion of an overall receive signal. The individual received signals are amplified and presented to Analog-to-Digital (A/D) converters where digital representations of In-phase (I) and a Quadrature (Q) components of the received signals are determined. Incidentally, it is in this amplification stage that most of the noise which comprises the overall system noise is inherently introduced, as in any receive system. A phase reference is established which is necessary for subsequent processing and the I component, also known as the I-vector, is set to this phase reference while the Q component, or Q-vector, is established 90 degrees out of phase with respect to the reference.

A clock reference for the A/D conversion is synchronized with the phase reference. Each of the I and Q components, thus, contains both signal and noise and may include other unwanted signals as well, in the form of interference, as discussed above. Some signals that interfere with the desired signals are those that emanate from a direction within an "unenhanced" or real beam (and outside the angular coverage of the enhanced, or sharpened, beam). A discrimination process is provided in accordance with the invention by using several groups (3 in one embodiment) of signals from separate elements as part of a phase multiplying process. The desired discriminating affect results from the phase multiplying process because the groups are displaced from each other in distance and, therefore, phase.

Further, a multi-step process is performed on the collected data wherein a matrix for each of the I data, as well as the Q data, samples is initially created which includes several samples of signal-plus-noise data. The data is formatted and applied to an iterative process scheme consisting of an "iterative sequence programmer" and a special topographical number array that serves as a polarity "change sensor". Upon completion of the iterative process, "noise-only" data results which is the net algebraic sum of the different iterative values. The noise-only data is subtracted from the signal-plus-noise samples leaving only the signal, without noise.

The invention provides an improvement to the entropy of a sequence of events that have previously occurred and have been stored.

BRIEF DESCRIPTION OF THE DRAWINGS

The objects and features of the present invention will become more readily apparent from the following detailed description of the preferred embodiments taken in conjunction with the accompanying drawings in which:

FIGS. 11(a)–11(d) are computer printout representations illustrating the signal data formatting software inputs in accordance with the present invention.

FIGS. 13(a) through 13(d) are computer simulation printouts illustrating left (13(a) and 13(c)) and right (13(b) and 13(d)) topological groupings in accordance with the present invention.

FIG. 13(e) is a combined computer printout containing data from FIG. 13(c) on the left side and FIG. 13(d) on the right side to illustrate "column shifting affects" in accordance with the present invention.

FIGS. 14(a) and 14(b) are computer simulation printouts for I and Q data, respectively, illustrating the results of the iterative processing scheme in accordance with the present invention.

DETAILED DESCRIPTION OF THE PREFERRED EMBODIMENTS

Figure 1:
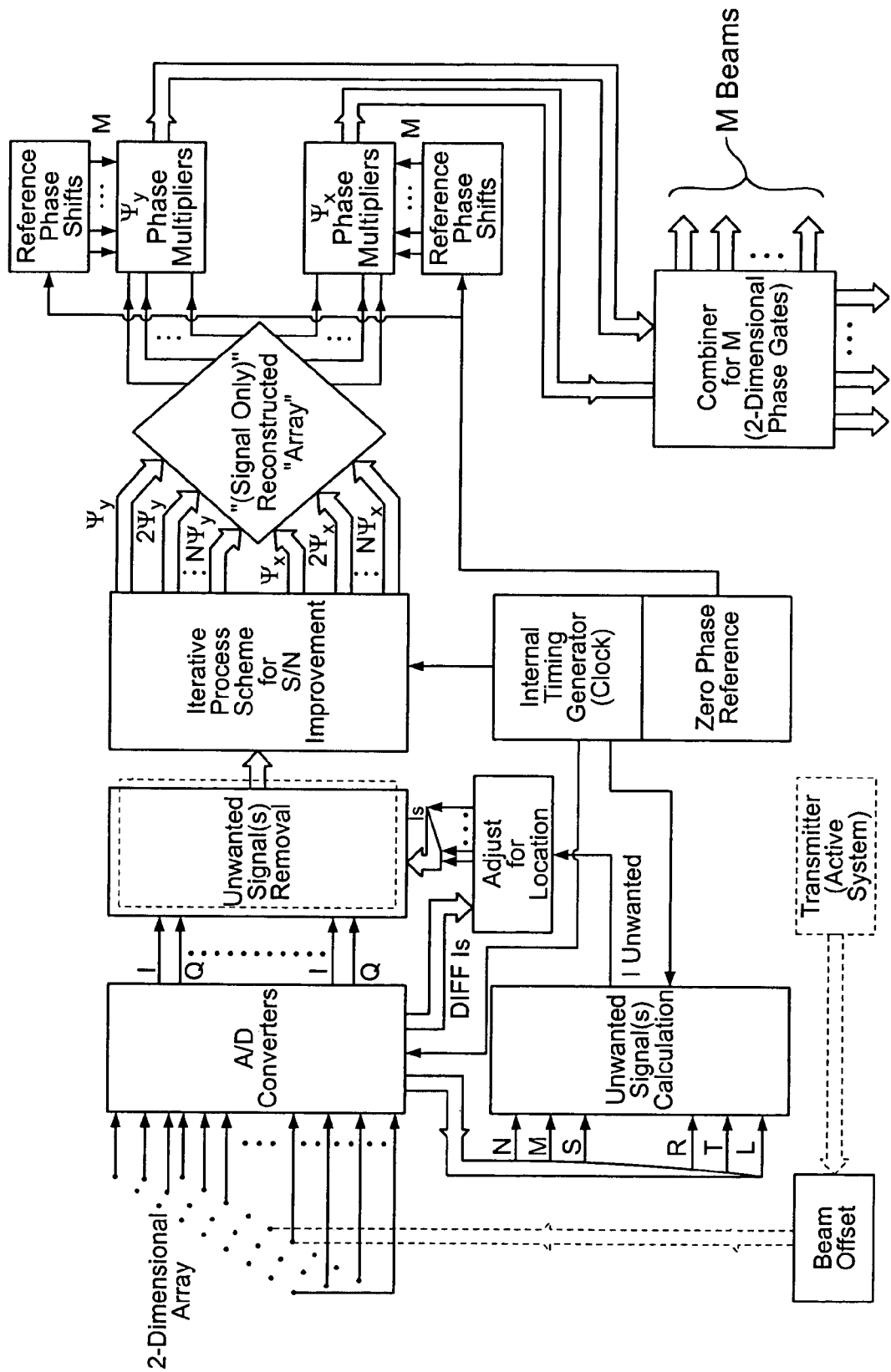
FIG. 1 is a block diagram illustrating an overall system configuration of the system in accordance with a preferred embodiment of the present invention.

Nature Of The Software Processing And Performance Impact

There are several aspects of the present invention specifically directed to improving the signal-to-noise ratio of a received signal beyond what would be predicted by classical information theory. These aspects are important to distinguish. Foremost of these aspects is the "offline" processing of stored information. Storage occurs as analog-to-digital conversion is performed resulting in a series of digital representations of the received data.

Subsequent processing is achieved using modern integrated circuits in an "offline" way that does not adversely affect the bandwidth of the system. Offline processing requires a tolerable transport time delay. As a consequence-of the delay, however, "near real-time" performance results. It is this aspect that presents fundamental opportunities over what can be accomplished in conventional real-time processing. Departure from real-time (analog systems) accounts for a potential to obtain signal-to-noise improvement substantially beyond that achieved by merely averaging noise samples (and applying the average to a matched filter). If one were to attempt to attribute the improvement over simple summing, it would lie in the improvement of the entropy of the overall process. The present invention has brought a degree or "order" not previously present.

The order achieved by the present invention is the result of iteratively forcing each and every sample of the noise to change polarity in a carefully defined manner. This iterative process is performed on successive trials.

The above aspect of the invention has a tremendous impact on performance and therefore is one of the primary aspects of the present invention. The ability to reduce "thermal noise" affects, inherent in any receiving system, to a level below that which can be achieved by the averaging of several trials is unique. This achievement is made possible by the "digital" nature of the process; however, the "digital" nature itself does not produce the achievement. Rather, it is the subsequent use of the digital data in the software, especially in the iterative process, that accomplishes the goal.

The invention, basically, consists of an improvement to the entropy of a sequence of events that have previously occurred and have been stored.

Unique Response To External "Noise" (or Interferences)

It is important to clarify how this invention differs from a multitude of approaches that discriminate against external interference often referred to as "noise". Such external noise is, of course, different than the thermal noise that has inherently limited the achievable performance of receiver systems and which is the basis of the dramatic improvement provided (and required) by this invention.

Externally generated "noise" (interference) is best reduced by improving the directivity of the antenna and enhancing its ability to discriminate among sources. When there is a multitude of sources (as in, for example, cellular communications), the many sources can be treated statistically as "external noise"; present state-of-the-art techniques attempt to extract a specific signal from such "random" background interference (or "noise").

It is appropriate to point out that while the processing of the present invention does not specifically address this type of situation in detail, it copes with such interference as part of its innate ability to act like a larger equivalent antenna (thereby having a much greater directivity or beam sharpness). This discrimination cannot be achieved unless the thermal noise had been reduced to near zero. Under these circumstances, the invention employs a phase multiplying technique to obtain a very high degree of resolution. This is performed by multiplication of a very accurately derived (noise free) angle of arrival, specifically calculated as the arctangent of Q/I.

The above angle is measured using 2 or 3 groups derived from different subparts of the array. (See FIG. 15 for the shape of its response.) Thus, the performance of the present invention minimizes the need for present state-of-the-art techniques for antenna interference reduction.

System Implementation

FIG. 1 illustrates examples of primary elements of the invention and their attendant functions, including: (1) a two-dimensional array, (2) S/N enhancement achieved by two interlocking processes and (3) beam width narrowing, performed in a manner to minimize "unwanted signal" interference.

The benefits of the present invention are best realized when all of the contributing elements of the invention are combined in a single overall system. However, the present invention and its benefits may also be realized upon separating independent elements and utilizing the separated elements independently to obtain desired results.

In accordance with an embodiment of the invention, a multi-element array is illustrated as part of FIG. 1. While this is a typical configuration in accordance with an embodiment of the present invention, it is not intended to limit the number of elements in each row or each column. Antenna elements are grouped in a manner to accommodate the interlocking processes of noise reduction and phase multiplication. The antenna array configuration is necessary to make the two mentioned processes viable; the noise reduction, in turn, further depends upon an iterative, multi-step process which is an essential part of the noise reduction process. The unwanted noise is reduced in several steps by a process that can detect whether the noise polarity resulting from each iteration changes.

Figures 10A, 10B:
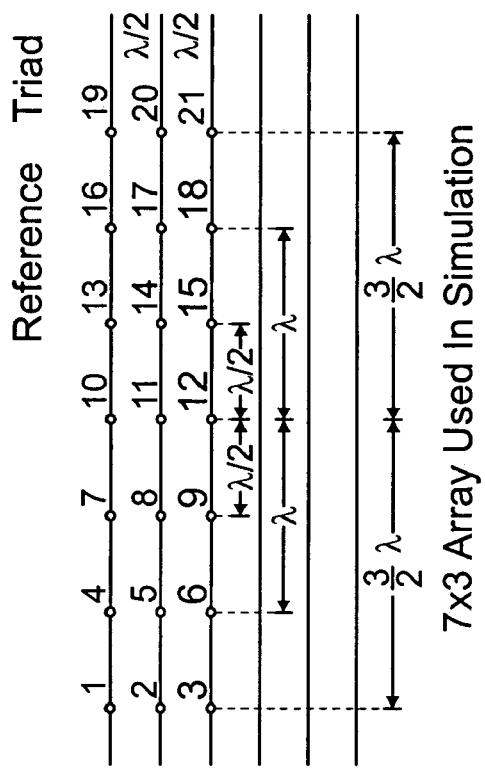
FIG. 10(a) illustrates a typical array configuration in accordance with the present invention.
FIG. 10(b) is a chart illustrating example voltage values and related average and sum values for data received from an array as shown in FIG. 10(a).

As the number of total antenna elements is increased, a wider variety of configurations becomes possible. For example, the antenna element configuration shown in FIG. 10(a) utilizes seven groups of three elements each contributing to the reduction of noise in each group to achieve I and Q signals suitable for the subsequent phase multiplying operation. According to one embodiment of the invention, each group receives six signal-plus-noise samples, three from a 'left' group and three from a 'right' group. For each of the right and left groups, the signals are predictable in relative magnitude as determined by trigonometry, while the noise samples are totally decorrelated. The spacings, in azimuth, between the left and right groups of elements are multiples of a half wavelength ($\lambda/2$) with respect to the center of the reference group (of three vertical and seven horizontal elements). This spacing provides azimuth discrimination enhanced by the phase multiplying operation which can be performed mathematically by subsequent digital processing.

The individual antenna elements are designed to be as broad-banded as feasible. Because there are relatively few elements of half-wavelength spacing (as compared to a large multi-element array), the frequency sensitivity of the total array can be designed to function properly over a reasonably wide frequency range.

The signal from each "receive" element is amplified by an appropriate amplifier (not shown). Accordingly, the overall noise of the system is introduced primarily at the front-end of the receiving system. The amplification process may include a low noise amplifier in many applications. After amplification, the signal from each element is converted to a digital value in the form of I (in-phase) and Q (quadrature) components. If several signals are simultaneously present, for example at different elements of the antenna, the overall I and Q values will be the vector composite of the several signals present. These overall values will change from time to time, i.e., from sample to sample from the A/D converter. The observation time for each set of signals is determined by the desired reception characteristics (such as information rate and other characteristics of the desired receive signal).

The frequency of the signal received at each antenna element can be "heterodyned" to permit the key operations to be performed at a lower (intermediate) frequency. The reference is signal, or local oscillator (LO), is referenced to the carrier by deriving the LO signal from a common frequency reference. The lower frequency limit of the heterodyned signal is determined by the bandwidth needed.

The signal from each element is amplified to provide a convenient working amplitude at an acceptable signal-plus-noise level for the subsequent processing. Accordingly, several branch signals can be obtained, each having the same S/N ratio as the original signal. Any noise introduced after this point, by subsequent circuitry, is negligible compared to the amplified signal-plus-noise. This is unlike the effect of dividing the signal directly from the elements into N channels before amplification. Since almost all of the noise is introduced at the input to the receiver, dividing the signal before this point would divide the overall signal power by N.

The I and Q outputs from each of the associated elements are used for different purposes to achieve the overall aspects of the invention. Each element can perform its necessary function independently without affecting the digital outputs of other elements. When certain signals, such as interference, are present they appear in somewhat predictable ways at all of the elements.

The different computing functions shown in each of the several blocks can be processed simultaneously, and parallel processing is an option. The results are applied to effect the following sequence of tasks:

(A) S/N enhancement
1. Preparing a signal (plus noise) format from the antenna outputs.
2. Applying an iterative sequence of several controlled steps that results in the overall convergence (in steps) of the noise average toward zero.

(B) Resolution improvement
Software step 2 is performed as off-line processing while step 3 is performed using the result of step 2.

Enhanced signals from the many combinations of elements are arranged in a way that corresponds to the original array. This involves combining groups having like-signal phase multiples, e.g., group 1, group 2, etc. Phase multiplication and a subsequent summing operation are then performed with each group to achieve the desired higher resolution (and S/N ratio).

The resolution improvement portion of the present invention will be discussed first since, conceptually, narrowing the beam of the receive system occurs prior to, or simultaneously with, receiving the desired signals. However, the sequence of operations can be changed in order to accommodate different processing techniques which lead to similar results. Subsequently, the processing portion of the invention which leads to S/N reduction will be discussed.

Resolution Considerations

Figure 2A:
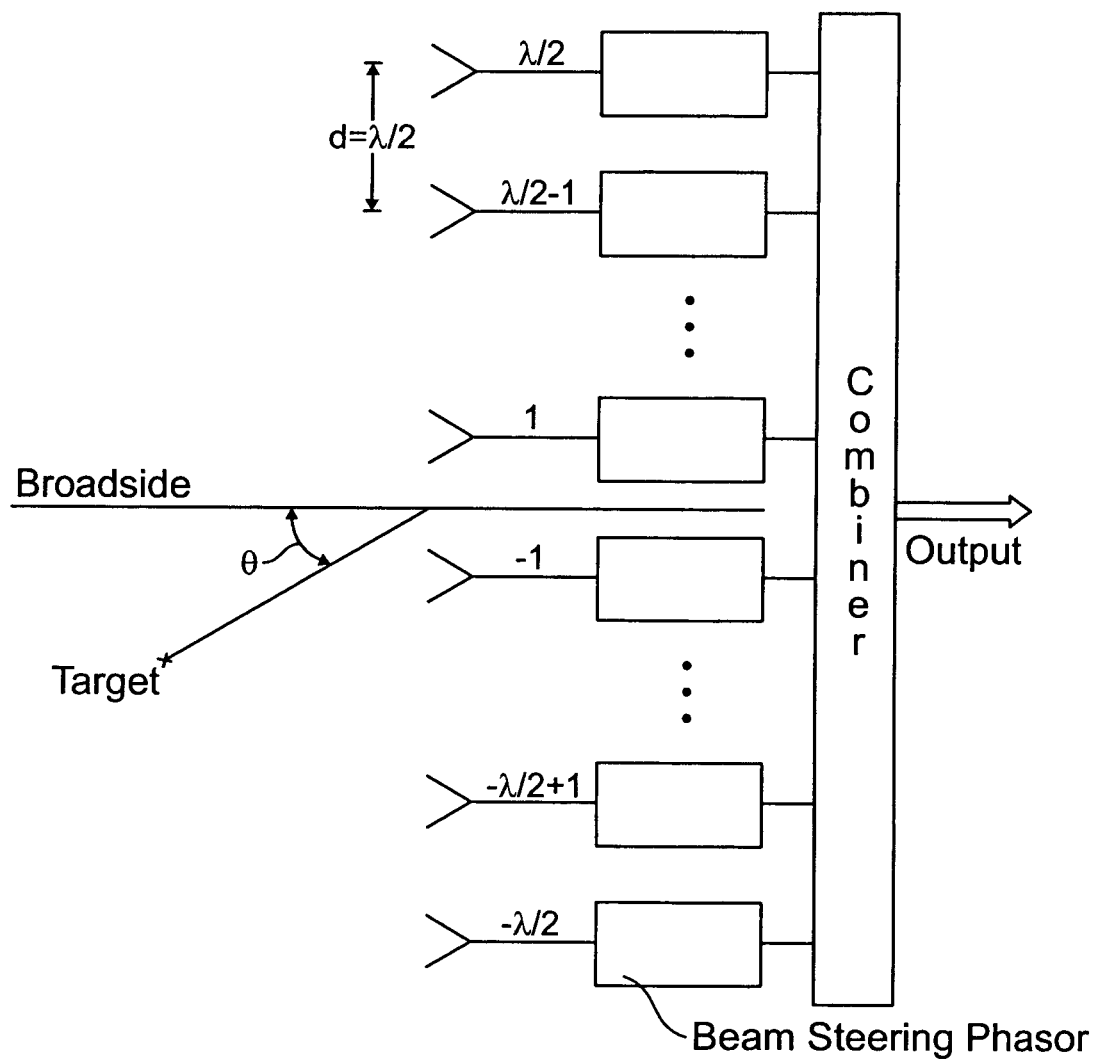
FIG. 2(a) is a block diagram illustrating a portion of an antenna array in accordance with an embodiment of the present invention.
Figure 2B:
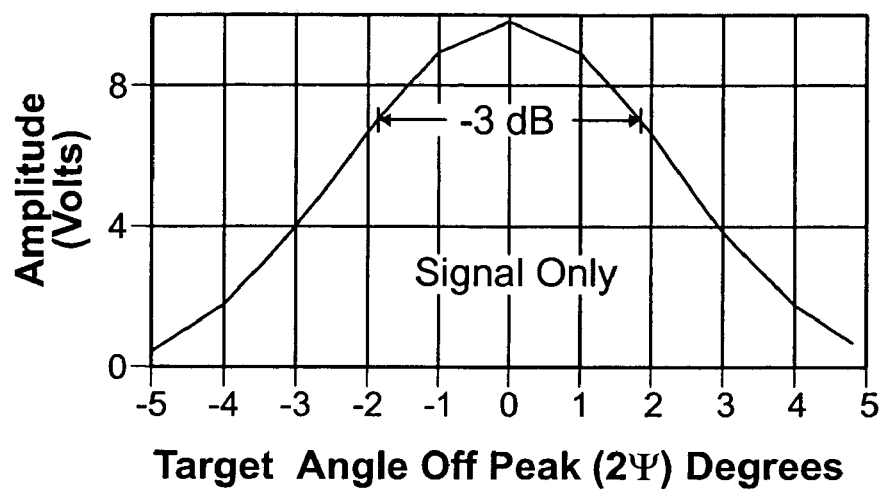
FIG. 2(b) is a representation of signal amplitude (volts) versus angle, $\theta$, according to the array shown in FIG. 2(a).
Figure 3A:
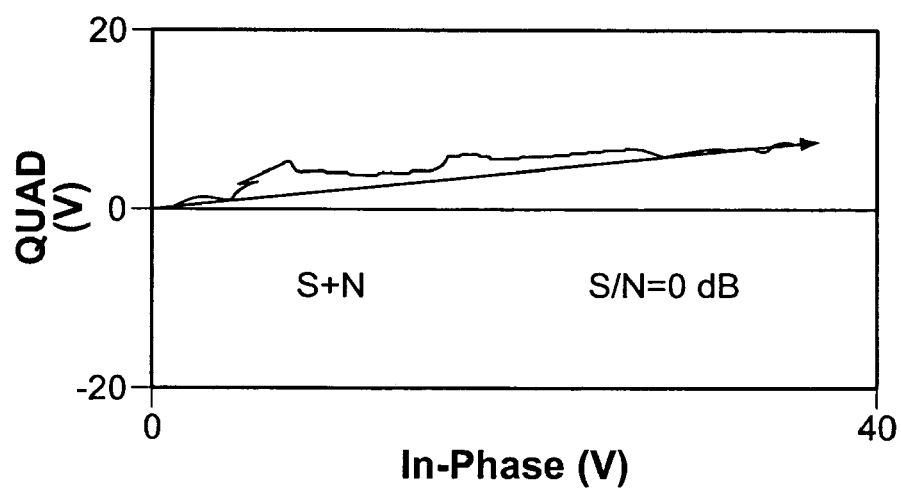
FIGS. 3(a)–3(c) are chart plot illustrations of the I vs. Q vectors for a collection of receive elements for S/N ratios of 0, 10 and 20 dB, respectively.
Figure 3B:
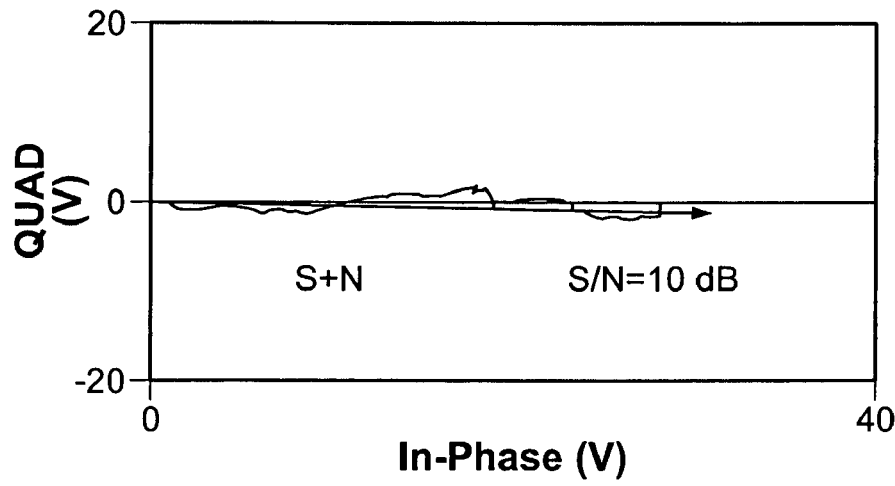
Figure 3C:
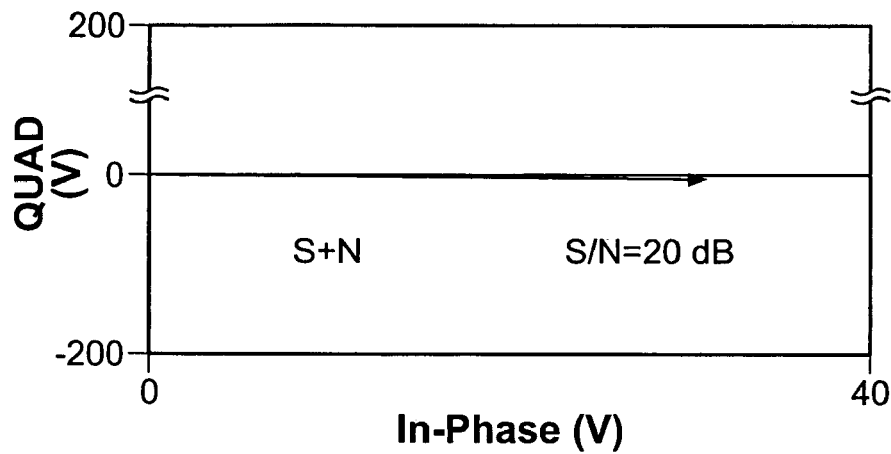

FIG. 2(a) illustrates a basic array of like elements in one dimension. A generic array yields an amplitude versus angle $\theta$ (referenced from the broadside) response as shown in FIG. 2(b). The composite vector resultant of all vectors from all of the elements produces the response shown in FIGS. 3(a)–3(c) for three different signal-to-noise levels, namely 0 db and 10 db and 20 db, respectively. At the 20 db level, FIG. 3(c), there is almost no Q component. However, the Q contribution grows as the signal is reduced, as shown in FIG. 3(a).

Figure 4A:
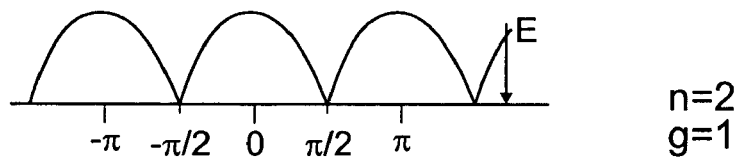
FIGS. 4(a) and 4(b) are graphical representations of two different array factors to help explain the present invention.

In an antenna array configured accordingly, vector addition of elements creates an overall pattern by modifying the composite pattern of each element by a factor called the "array factor." For a simplified two-element case, the array factor would take the form shown in FIG. 4(a).

Figure 4B:
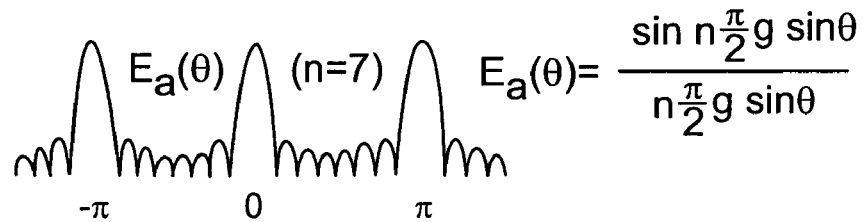

If, however, instead of two elements there are N elements, each spaced a fixed distance apart, the array factor takes the form shown in FIG. 4(b), in which N=7. Thus, for the multi-element case, the array factor shape approximates the function (Sin nx)/nx.

A key aspect of the invention is the establishment of a phase reference, as discussed previously, such that the desired output signal will occur "in-phase" with the reference. There are two important factors that cause the desired signal to be displaced from zero phase (Q=0). One is the phase, β, of signals intercepted, or arriving, at each element with respect to the phase reference. Phase, β, can assume any value between 0 and 2 π radians. Since β is the same for signals intercepted at all elements at a given time, it can be canceled when the comparison is made between pairs of elements. This beta cancellation takes place automatically, early in the overall process, i.e., when the signals are combined, and after each signal has been converted to I and Q digital components.

Resolution Improvement by Phase Multiplication

The beam narrowing aspect of the present invention approximates the array factor shown in FIG. 4(b) by using several different phase multipliers, making the Nth signal appear as if it came from a radiator +NS distance away from the center of the array of elements. In this process, there are additional signals constructed to correspond to those that would be received from radiators separated by a distance 2, 3, 4 . . . N times S/2, i.e., times half wavelengths of the phase, β. These additional signals are required to place more of the signal energy into the "main beam" to better approximate the array factor of FIG. 4(b).

Figure 5:
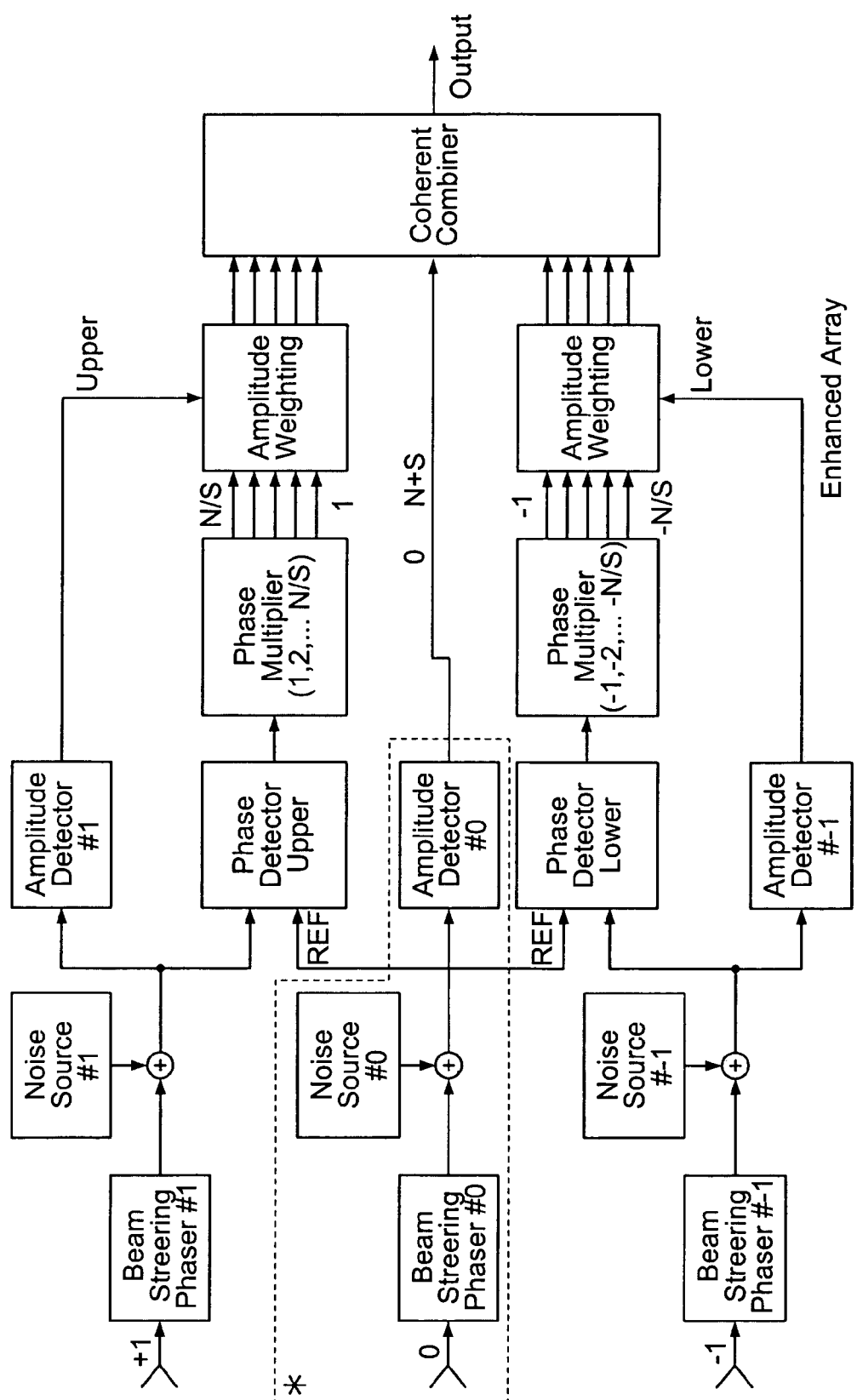
FIG. 5 is a block diagram illustrating the process flow of a phase multiplying aspect in accordance with the present invention.

To accomplish the above objective, the phase shift +(phi) is obtained from two or more elements and "magnified" by 1, 2, 3 . . . N different multipliers as shown in FIG. 1. Alternatively, N radiators, equally spaced between 0 and half a maximum distance, Smax/2, can be used to provide different phase shifts, $\phi_1$, $\phi_2$, . . . $\phi_n$. Such different phases would be magnified by different multipliers, $N_1$, $N_2$, $N_3$. Actual radiators are placed a half-wavelength, λ/2, apart (or multiples thereof) to prevent dividing the signal power among the different radiators. The basic operation, shown in FIG. 5, can be summarized as follows: A signal $s_1$ is captured at antenna element 1. Signal, $s_1$, is initially phase rotated through an angle less β and then a key operation is performed: a phase angle φ is subtracted, corresponding to the phase of a signal from a physical angle θ from the normal to the array plane. The phase difference, E, between the actual signal $s_1$ and that of the theoretical one emanating from precisely the desired pointing angle θ is then repeatedly phase multiplied by integers ranging from 1 to N. Each one of these products corresponds to the output of a corresponding antenna element. By summing these outputs coherently, the angular sensitivity of the array can be increased by a factor of N.

Figure 7A:
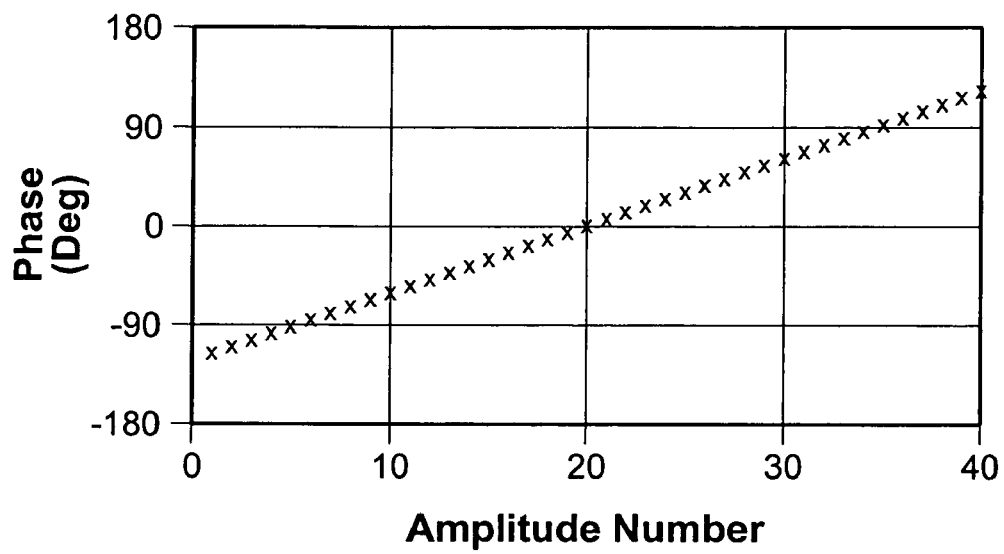
FIGS. 7(a)–7(b) are graphical representations of phase and amplitude versus the number of array elements in accordance with the present invention.
Figure 7B:
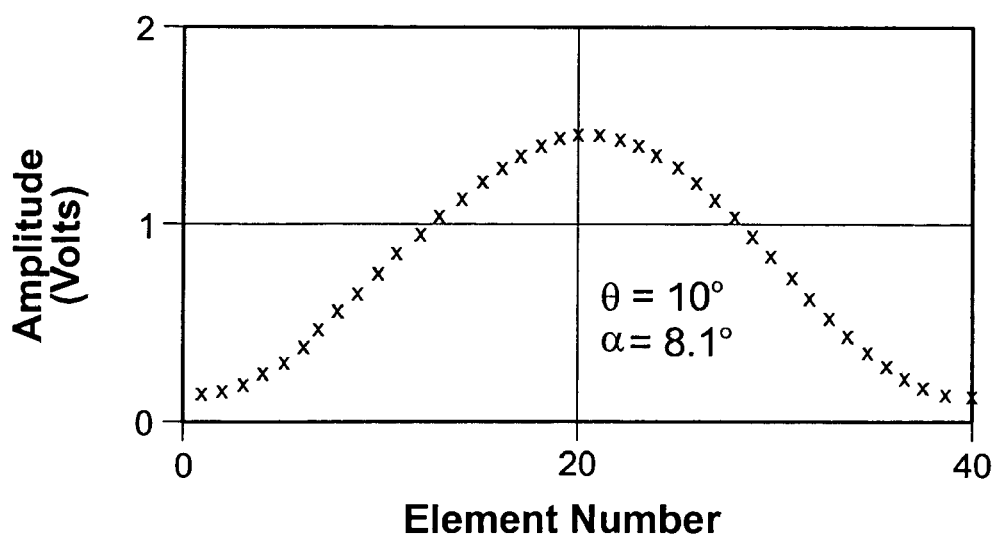

The resulting amplitude and phase characteristics resulting from the phase multiplication techniques just described are shown as FIG. 7.

Figure 6A:
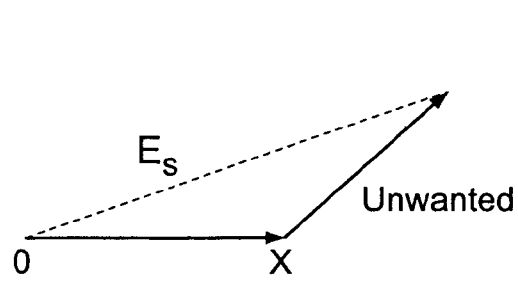
FIGS. 6(a)–6(d) are vector diagrams illustrating various vector combination techniques in accordance with the present invention.
Figure 6B:
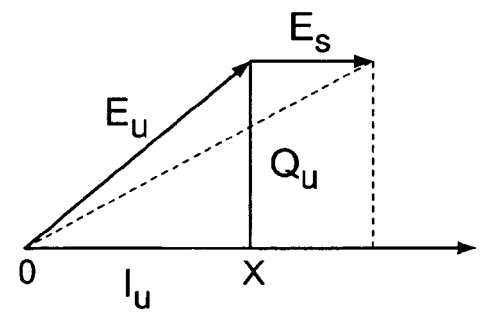

To aid in understanding the affects of noise, a fundamental addition to the process just described is provided. This addition is best understood by reference to FIG. 6(a) which shows the vector sum of the desired signal, $E_s$ and an unwanted second vector, $E_{unwanted}$. The desired signal is shown as an in-phase (or horizontal) vector while the undesired signal is represented by a vector, of arbitrary angle, joined at point X in FIG. 6(a). Such a vector diagram is representative of the output of each element of the array after amplification of the received signal. Also, both the phase and magnitude of the unwanted vector are "unknown" (Note that the same vector result occurs when the vectors are interchanged as shown in FIG. 6(b)).

Figure 6C:
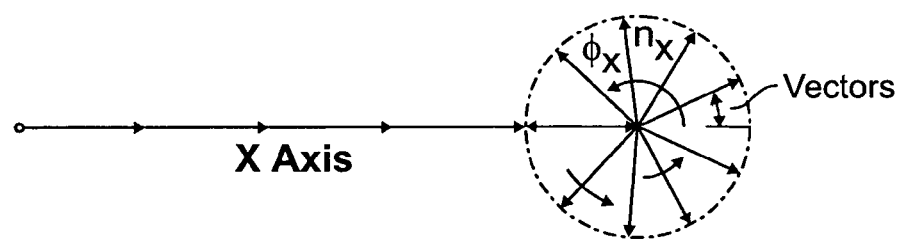

The key to achieving the desired performance of a receiving system according to the present invention is to execute the phase multiplication process about the vector junction point X rather than the origin (point 0). When multiplication takes place about X, the desired signal vectors all align end-to-end while the undesired ones "spin" around, as shown in FIG. 6(c).

Figure 6D:
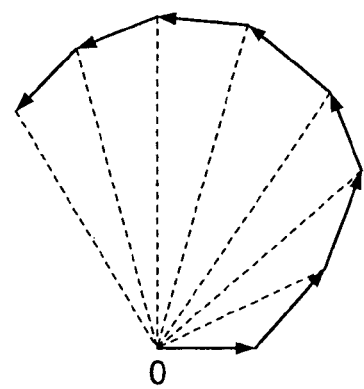

If the rotation takes place about the origin, 0, the result is as shown in FIG. 6(d). Here, the composite vector E is formed by the addition of the vectors at end-to-end multiple phase angles so as to form the "clam shell" type of diagram illustrated by FIG. 6(d). A consequence is that the X components of the signal do not all add in phase and when the number of multiples of N is large, the signal component is substantially reduced relative to the noise.

"Phase Gate Analog"

Figure 8A:
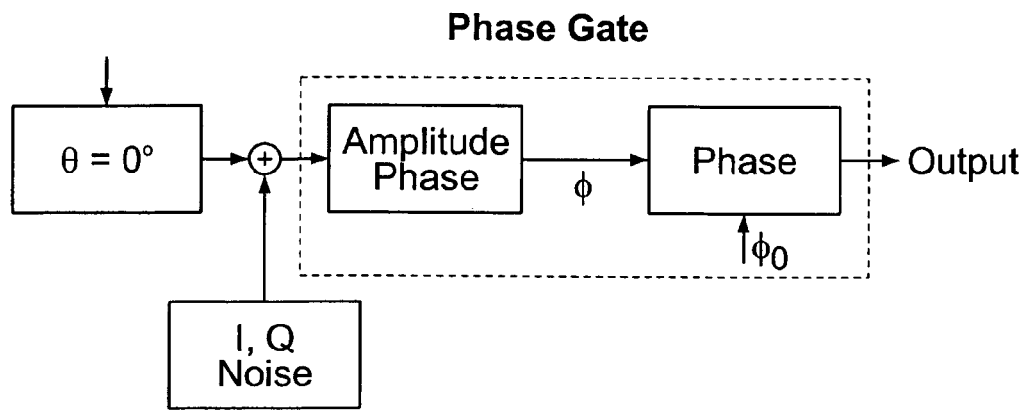
FIG. 8(a) is a block diagram illustrating a phase gate technique in accordance with the present invention.
Figure 8B:
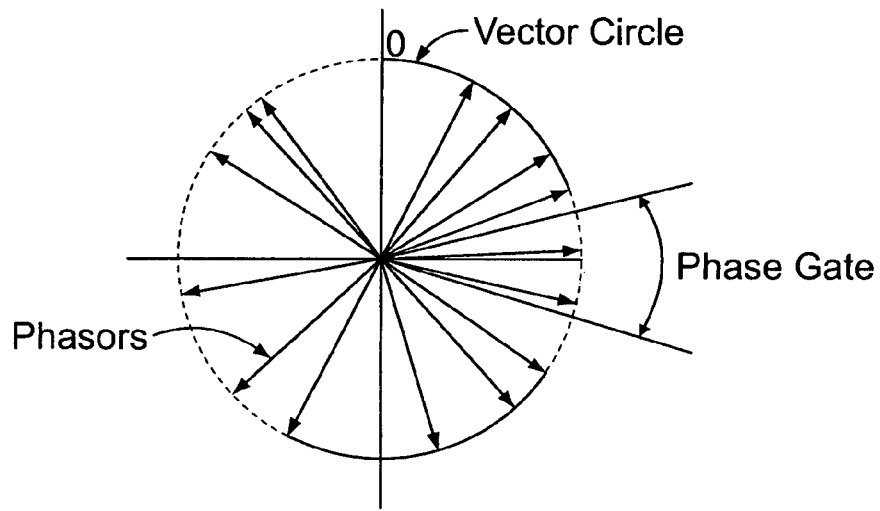
FIGS. 8(b) and 8(c) are graphical representations of the results of a phase gate technique in accordance with the present invention.
Figure 8C:
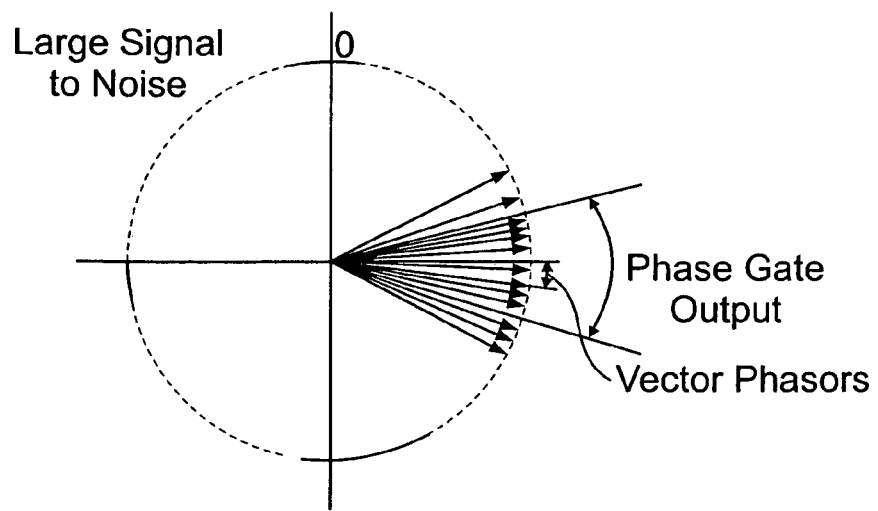
Figures 1, 9A:
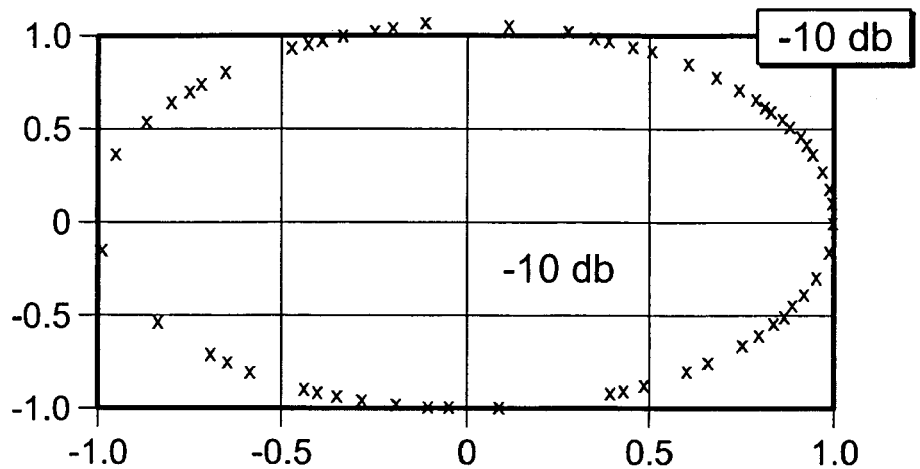
FIG. 9(a) is collection of four plots at four different S/N ratios illustrating computer simulation results from the phase gate technique associated with FIGS. 8(b) and 8(c).
Figures 2, 9A:
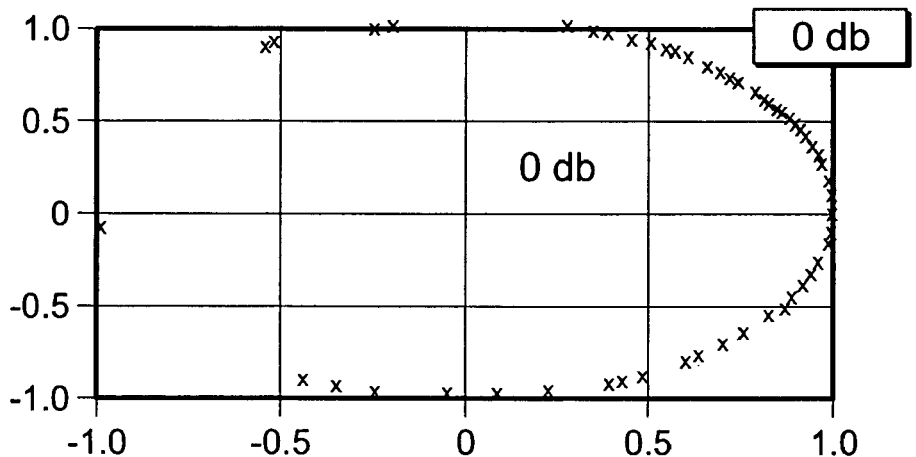
Figures 3, 9A:
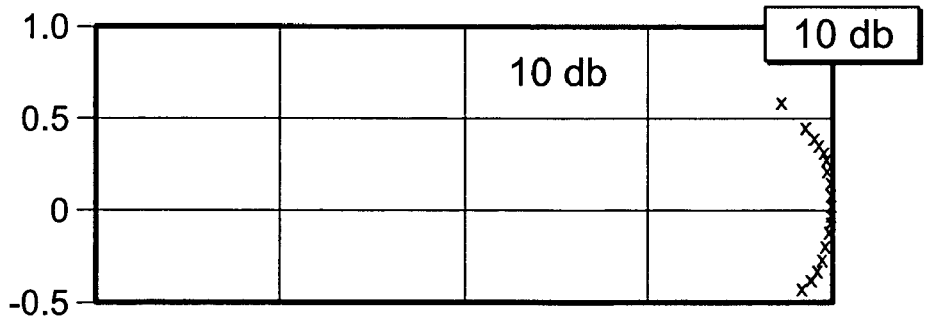
Figures 4, 9A:
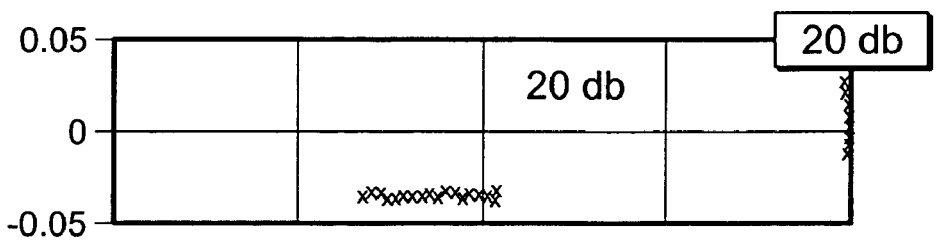
Figure 9B:
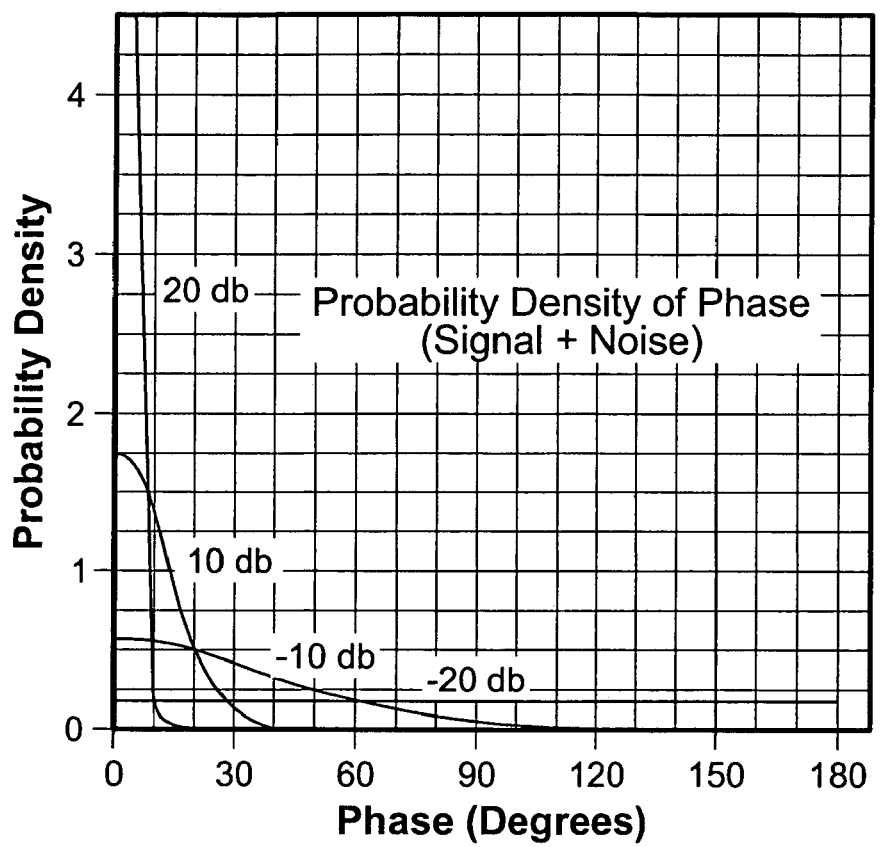
FIGS. 9(b) and 9(c) are plots illustrating the probability density for the phase of signal-plus-noise at various signal-to-noise ratios.
Figure 9C:
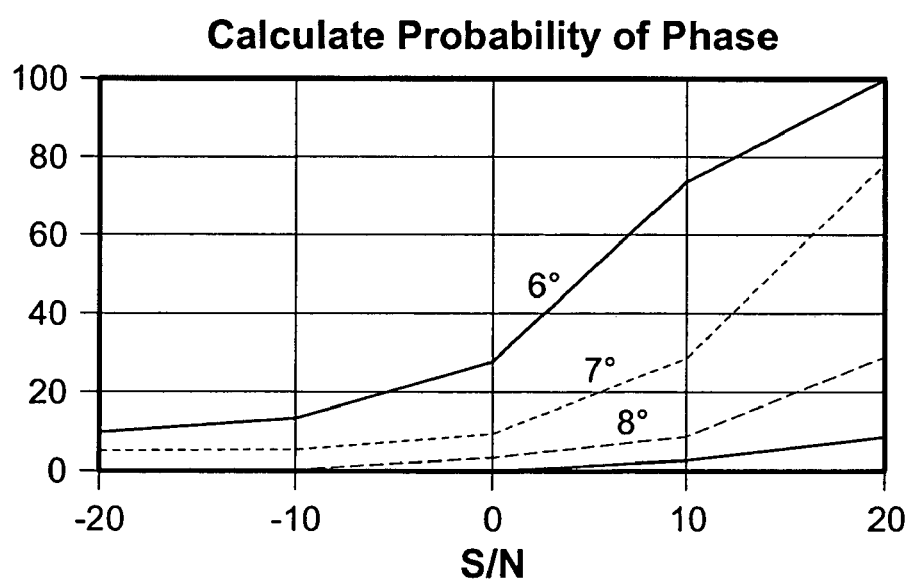

Conceptually, the phase-multiplication process can be regarded as a means of forming a phase "bin" or "gate". Such a concept helps in understanding the formation of multiple beams as explained later and the configuration is represented by simulation, as shown in FIGS. 8(a)–8(c).

If a phase angle, $\phi_A$, is chosen to correspond to the axis crossing of a signal to be detected, the center of the phase gate corresponds to $\phi_A$. The phase gate is used to discriminate between signals whose φ is other than $\phi_A$ plus or minus a small Δφ width. When φ=$\phi_A$ the desired conditions are obtained. Ideally, maximum signal output occurs due to signal vector alignment (along the horizontal axis) at all values of n as illustrated by FIG. 6(c).

Signals at all values of φ other than $\phi_A$ are attenuated, because they are displaced by angle θ and, hence, phase φ and therefore fall outside of the phase gate width. The amount of attenuation is determined by the skirt response of the "gate" which is related to the beam shape.

The "sharpness" of the amplitude peak as shown, for example in FIG. 7, increases as n is increases. When 1 through N simulated elements are summed, the composite result is shown, for example, by FIG. 16(a). When two-dimensional enhancement is involved, these can be N2 vectors at a specific phase $\phi_x$ and $\phi_y$, combination (FIG. 16(b)). This serves to sharpen the amplitude characteristic further. The "half-power" width of the phase gate determines the "half-power" width of the narrowed beam(s) that are formed. Additional phase gates could be spaced in-between successive phase gates, thereby placing intermediate sharp beams in the total antenna pattern (FIG. 16(c)).

The entire phase gating process can be carried out in parallel by splitting the input signals into n channels and running n phase gates in parallel. By adding additional phase gates and splitting the signals to feed them, all possible beam positions can be observed simultaneously, if desired. Such an arrangement constitutes a "pin cushion" of beams.

The successful use of the above process is dependent upon the reduction of noise and other interference so that the phase multiplying process takes place about the origin, 0, as discussed previously. This requires a negligible displacement due to either interference or noise. This will become more evident after a demonstration of how noise affects the process.

Simulated Performance of Phase Gate in Presence of Noise

The basic premise for a phase gate is that the phase of signal-plus-noise depends on the signal more than on the noise, since over multiple samples, noise phase is random from sample to sample, while signal phase is constant. Thus, if the phase of the signal-plus-noise is measured and compared to the expected signal phase, samples can be separated into those that are close to expected and those that are not.

The basic phase gate concept is illustrated in FIG. 8. The phase of noise-corrupted samples is measured and compared to a phase threshold. If the measured value falls within plus and minus half the selected phase gate threshold window value, the sample is passed on to the output, otherwise the sample is dropped. This approach corresponds to a rectangular gate which is an idealized form for analysis.

The signal phase is assumed to correspond to the system reference phase so the phase gate can be symmetrically set about this value. The signal phase would be a priori set to correspond to some value of φ; many values of φ could be accommodated by a "bank" of contiguous phase gates, each of which accepts a different phase value, so any signal phase will line up in one channel.

A simulation was performed which generated Gaussian noise and embedded a signal with known S/N and phase. FIGS. 8(*b*) and 8(*c*) illustrate the S+N phase vectors, in general, for noise-only and for large signal-plus-noise (S+N), respectively. In the noise-only case (FIG. 8(*b*)), the phases are uniformly distributed over 360 degrees, so a phase gate of, about 10 degrees, would pass, on the average, $\frac{1}{36}$ of the applied samples. With a signal present (FIG. 8(*c*)), the phases become non-uniform, and "bunch-up" around the signal phase value. Thus, in the presence of a signal many more samples are passed through to the output, for the same 10° phase gate.

For the simulation, a computer was set up to generate phasor diagrams similar to those shown in FIG. 8(*c*). FIG. 9(*a*) shows such diagrams for values of S/N of −10, 0, 10 and 20 db; (the diagrams would be circular if the two scales were the same). Each "x" designates the location of the vector tip. Each diagram represents 100 random samples of S+N. Thus, 100 "x's" are provided in each of the plots of FIG. 9(*a*). However, due to overlap of some of the "x's", all 100 are not visible in every plot. For positive S/N values, the phase bunching becomes quite pronounced.

FIGS. 9(*b*) and 9(*c*) show the probability density for the phase of signal-plus-noise at various signal-to-noise ratios and illustrate the effect of transitioning from wide to narrow phase gating.

The density function is used to obtain the probability of passing a sample through the phase gate by integrating the density over the gate window using numerical computation. FIG. 9(*c*) shows the results for phase gate sizes of 3, 10 and 30 degrees, for various values of S/N.

The simulation illustrates a deficiency of phase gating, because the phase multiplication takes place about point 0 rather than point X, as illustrated in FIG. 7.

If the phase multiplying takes place about point 0, the "phase gating" acts on the combined sine wave, degrading the S/N because of a disproportionate loss of signal. As a consequence, array enhancement can only be achieved for relatively high effective S/N ratios, as is achieved with the present invention. Phase perturbation, Δφ, introduced by the noise will cause the S+N voltage to be phase rotated and, hence, fall off the peak response (or outside the gate for the rectangular gate example as described with reference to FIG. 8(*b*).

By way of further clarification, it is helpful to consider a signal whose angle of arrival is precisely at the peak of the enhanced array beam. By "phase gate" action, all "n" values of the signal will add in-phase after phase multiplication giving a maximum output signal. A concurrent noise voltage will, in general, be at a different starting phase than the signal. It may seem that the Δφ associated with this noise will be multiplied by "n" causing various noise phasors at the phase gate output. This does occur when no signal is present and the noise is reduced by the dispersion of the noise vectors.

However, when a signal is present, the conditions necessary to achieve S/N improvement do not apply. S/N improvement requires that the noise voltage phase move relative to that of the signal. Since a phase multiplier multiplies the Δφ, this might seem plausible. However, this would require that the superposition principle apply. Unfortunately, this does not apply because during phase multiplication, the Δφ's cannot be treated independently for the signal and for noise; rather the composite phase is multiplied and, thereafter, the phase due to noise and signal are not separately identifiable. The actual voltage available to the phase multiplier is the vector resultant of the signal-plus-noise. This is represented by a single waveform whose zero crossing has been shifted from that of the signal alone by an amount dependent on the noise, phase and magnitude.

Thus, the requirement becomes one of automatically finding point X for each sample. When the voltage representing the horizontal vector X is found, it can be subtracted so as to make the phase multiplication take place effectively about point O("X" and "O" are now the same).

Methods of obtaining a significant number of appropriate signal and noise samples will be described later. These are used for estimating the signal (i.e., vector O-X) for each noise (plus signal) which is the essence of the S/N reduction portion of the present invention. Under these circumstances, the phase gate analogy is valid and the representation for gate formation from one or two array dimensions, as shown in FIG. 16, apply.

The following is a description of the S/N enhancement portion of the present invention.

Formatting The Antenna Elements To Provide Software Inputs

An important requirement of the S/N enhancement portion of the present invention is to arrange the digital outputs of the array elements to serve as suitable inputs to the overall software processing scheme.

The ultimate role of the software is to minimize the noise component of the average of several voltages, each consisting of signal and noise, that are appropriately chosen from a larger array, as described below.

A 3×7 array configuration in accordance with the present invention is shown in FIG. 10 with corresponding elements (1–21) numbered as shown. The vertically aligned elements 10, 11, and 12 at the center of the seven columns constitute the virtual reference phase for the entire array; the rest of the elements form three separate groups. Each group includes three left vertical elements and three corresponding right vertical elements, i.e., the left and right elements are spaced equidistant from the center column, as indicated. The first group is the one with the greatest number of half wavelength, λ/2, spacings between the left and right group and consists of elements 1, 2 and 3 on the left and 19, 20 and 21 on the right. Elements 7, 8, 9, 13, 14 and 15 form the left-right group with the least number of λ/2 spacings. The three different half-wavelength spacings of the groups result in x1, x2 and x3 signal phase shifts for each group respectively and supply corresponding I and Q voltages. The I and Q voltages are eventually used to form the arctangent of Q/I which is used for the phase multiplication function. This is done only after I and Q samples with very high S/N (i.e., low noise) have been achieved.

The voltage at each element consists of a desired signal portion and an unknown and unwanted noise portion. The first fundamental objective is to separate the "average signal" from the "average noise".

There are I and Q outputs created from each of the elements and these orthogonal components are treated independently (and can be processed in parallel to save processing time). The average I and Q values from each sextet can be readily obtained, however, these values contain both signal and noise. The six I, or six Q, values can be combined in pairs to afford more signal-plus-noise permutations to work with; (thus, in accordance with an embodiment of the invention), nine such pairs are formed. These nine pairs are completely correlated with the original six elements and, therefore, provide no noise reduction; however these pairs are used to formulate a (3×3) matrix which contains the information utilized in setting up a noise matrix for pattern recognition.

FIGS. 11(a)–11(d) are computer printouts of the simulated voltages at the twenty-one array elements. Each trial contains signal voltages for both an I or Q sextet; these voltages result from the angle of arrival of the signal combined with simulated random noise having typical probability density characteristic based largely on a Gaussian distribution. Of critical interest is the display of twenty-one numbered voltages at the upper middle of FIG. 10(b). This information is used to form a sextet at the top of each separate trial group of FIGS. 11(a)–11(d).

The index numbers, i.e., 4, 5, 6, 16, 17 and 18 in FIG. 11(a), refer to the six element locations with respect to FIG. 10, used for that trial. The rest of the information reflects the processing results as described below.

The first operations of the S/N enhancement portion of the present invention are aimed at removing the signal from the signal-plus-noise data so as to isolate the noise into a noise-only (3×3) matrix.

Originally, another objective was to predict the probable polarity of the noise average with at least 65% correctness. A subsequent iterative process could then reduce the noise average in steps to achieve a greatly reduced noise magnitude. The latter process possesses the ability to tolerate "mistakes" in making predictions as discussed hereafter.

Polarity Prediction Approach Using Noise Matrix

The "noise only" matrix represents a noise signature for each trial and is established separately for the I and Q components. Such a matrix involves the signal-plus-noise entries of the "left" half of the six outputs from the antenna to be "toggled" (i.e., reversed in polarity) without introducing any "new" noise. This is achieved by simply multiplying the digitally formatted (and stored) numbers by minus 1.

Each matrix is subjected to an examination to provide a statistical estimate of the net polarity of the average of the six noise samples. The result is applied to a fault-tolerant iterative process that makes several progressive changes to the noise average that result in "new averages". These measures are part of a generally overall converging process tending to zero.

The average I's or (average Q's) from each sextet can be readily obtained, but these quantities contain both signal and noise. The six I's (or six Q's) can be combined in pairs to afford more signal-plus-noise permutations to work with; nine such pairs are formed in the example. (Because these 9 pairs are completely correlated with the original six, there is no noise reduction provided,) but 9 entries are needed to develop a 3×3 matrix.

The next step in the processing is to make the process independent of the signal level so that the subsequent processes form a matrix of noise-only entries. To develop such a matrix, two mathematical quantities are derived, both of which are independent of signal level, i.e., they reflect solely "noise".

The first of these quantities is designated IA (or QA) and represents the deviation of a particular I (or Q) noise sample from the average noise value. The IA value is formed simply by subtracting the average I (or Q) from each I or Q. In this process the signal components cancel, leaving only the noise deviations from average noise. Under these circumstances the minimum absolute value will identify the I sample (or Q sample) whose noise is closest to the actual noise average. Hereafter this is referred to as the "key entry" and occurs at a specific one-of-nine combination of pair indices; it is marked with an "*" symbol to the left of the entry.

A second quantity that contains no signal is also developed and it represents the change that occurs when the polarity of the three right I (or Q) polarities are reversed, hereafter referred to as "toggled"; this is determined by comparison to the original values of the nine combinations (formed from the original sextet). At this stage, each of the nine "deltas" (i.e., differences) contain a signal component which will be removed by the next step. These deltas have a pattern that repeats every three entries (i.e., every three entries the values are the same).

The average of these three repetitive values in the triad is obtained by averaging the deltas of these entries. This average is subtracted from each of the three different (an repetitive) values to form a "delta A" (similar to a QA or IA). This represents the deviation of each delta from the average delta.

The above two "noise-only" quantities are combined by subtracting each QA from the corresponding "delta A" to produce nine different noise-only indicators. These divide naturally into three groups of three, in which the like delta A's are grouped together in each of three columns.

The three entries in the first column (Col. 1) are given the most relevance by defining this column as the one that contains the QA of minimum absolute value, i.e., the key index or *. The other two occur in rotation working down from the * index. Typical trials are shown in FIGS. 11a–11d to illustrate the column configuration and the matrix.

To assess the result of each column, a "comparison value" is derived which provides the most credible value (and polarity) for the pattern that results in that column. There are five different basic processes that may apply; these are designated simply as A, B, C, D and E. The polarity of the comparison value depends upon whether it pertains to "Case 1" or "Case 2". Case 2 is assigned when the magnitude is large enough to tend to contradict logical noise assumptions. This is determined by comparison to a suitable threshold.

After the "key entry" is established, the other two entries are treated as a "balancing pair" for classification and assessment purposes. The "balancing pair" entry characteristics provide several assessments. For example, if these are quite different in magnitude, they give rise to what is determined "a high dispersion ratio". Such a parameter helps distinguish a C from an A, or a D from a B, and is determined as follows:

A dispersion sum is obtained by adding algebraically the balancing pair while a "dispersion difference" is the subtraction result. The dispersion ratio is simply the smaller result divided by the larger one of these; it is always less than 1 and positive. In regard to a dispersion ratio criteria, the following applies: C and D have dispersion ratios that exceed a suitable threshold (typically about 0.2). B is below this threshold. For process A which involves all like polarities and is averaged, the actual dispersion ratio is divided by 3.

Each of the "balancing pairs" is labeled by lower case b or upper case B; a "b" indicates the entry is of the same polarity as that of the key index entry. Conversely, a "B" indicates it has an opposite polarity. Combinations of like pairs of (b)'s, i.e., bb, or BB indicate processes A or C, while differences bB (or Bb) indicate processes B or D.

The above factors lead the choice of one specific column as the one of most probable choice. To further determine this choice, a "hierarchy of process" can be used.

Background and Role of Iterative Processing

Originally, it was anticipated that the noise matrix scheme that statically predicted the polarity of the noise component of each trial would demonstrate the limited improvement desired, remaining improvement would be achieved by a subsequent fault-tolerant iterative process. At the same time attempts were made to couple the iterative process more closely with the above process by simulating the two together. The aim was to make the results of the iterative process less dependent on the achievement of a high percentage of correct predictions. It was found that considerable correcting was possible to yield a higher correct percentage of predictions. Accordingly, the requirement for an initial polarity prediction was minimized, however, it remains a viable alternative.

An early iterative process depended on verification after each iteration using a polarity change determination. Determination requires using the aforementioned noise matrix predictions or a numerical change indicator designated as "R," which is somewhat signal dependent.

The noise matrix method was particularly unreliable in a "change sensing" role. The indicator "R" is determined using the I (or Q) value at the index at which the minimum IA magnitude occurs and such index can be selected from within each sextet as shown, for example, in FIG. 11. Accordingly, R is defined as the I or Q entry at this index divided by actual I average (or Q average). The numerator and denominator of the ratio both contain signal as well as noise; however, values of R greater than 1 can be distinguished from R values less than 1; as the signal becomes greater, R becomes closer to I and the "greater than" and "less than" conditions become more difficult to distinguish. While use of "R" as a polarity change detector was better than using the noise matrix, it was superceded by the TCS network with it better ability to continue to sense all pertinent iterative changes.

Figure 12A:
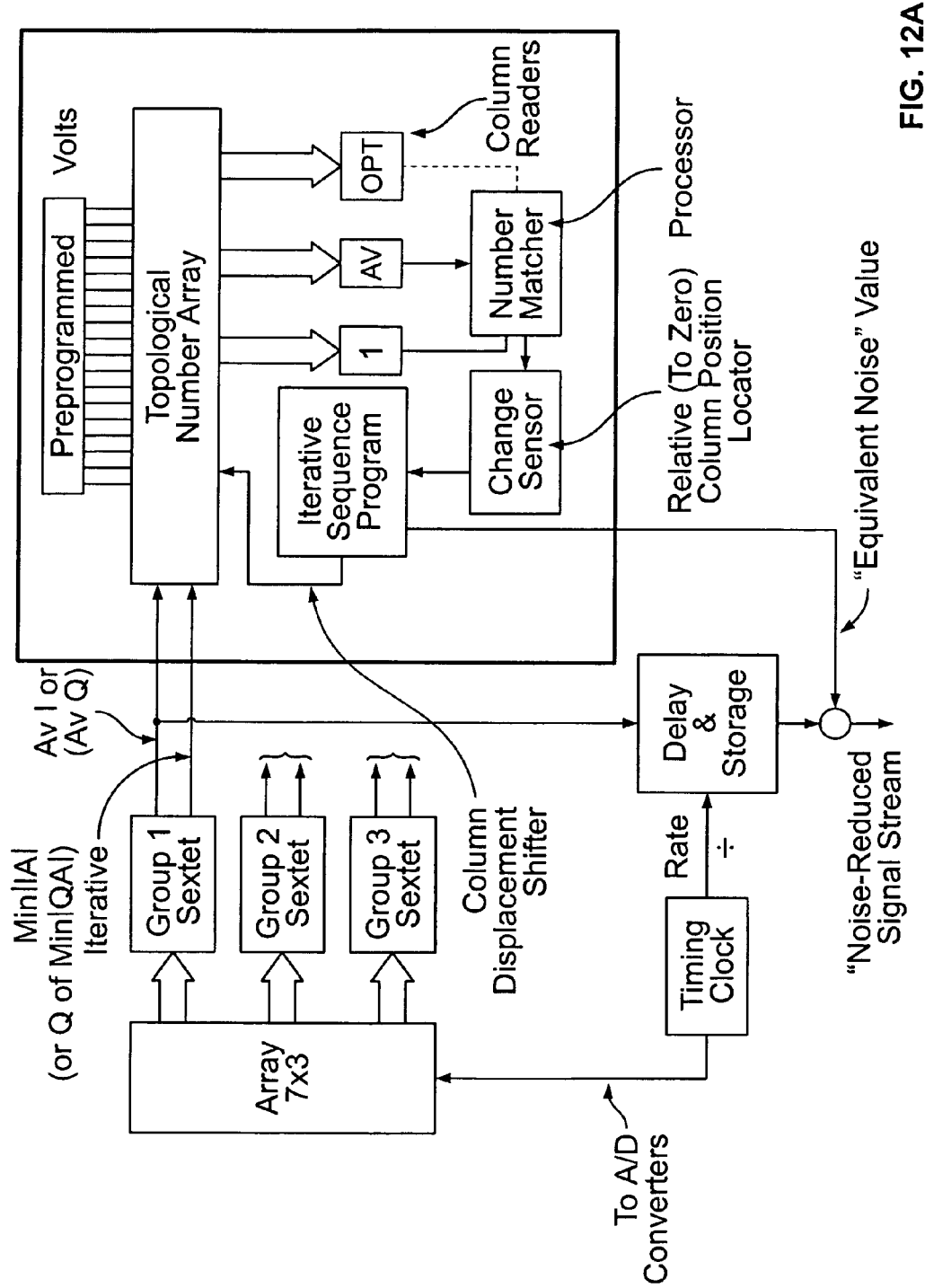
FIG. 12(a) is a block diagram of an iterative processing scheme including a Topographical Number Array which is used as a Topographical Change Sensor (TCS) in accordance with an embodiment of the invention.
Figure 12B:
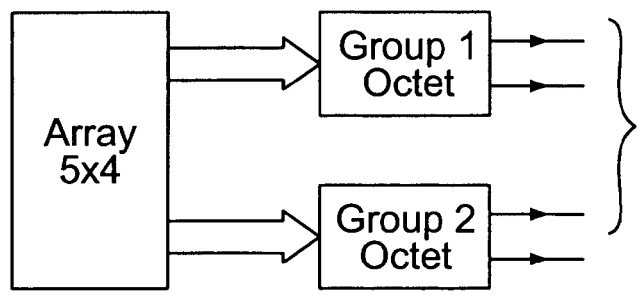
FIG. 12(b) is an alternative input stage similar to that shown in FIG. 12(a) except using a 5×4 array and octets instead of sextets.

The iterative process scheme (shown in FIG. 12(a)) consists of appropriate and prescribed steps that culminate in a substantial reduction of the average noise component of each trial. The fault-tolerant iterative sequence was simulated in various ways to arrive at a version that could be made to provide all of the desired characteristics. The resulting configuration, shown as FIG. 12, is effective and feasible from a reduction-to-practice standpoint.

The resulting configuration takes the form of a network or matrix of different plus and minus voltage injections applied (i.e., added algebraically) to appropriate I values. These include the average I and the I of minimum |IA|. One such matrix or number array is derived for each of the 2 or more same-phase groups, i.e., each group that has a different wavelength separation. Each of these groups provides a different signal voltage as determined by the trigonometry of the array outputs.

The "network" equivalent software is the outgrowth obtained from examining the "voltage added" aspects of different iterations of the process just described. Various voltage changes can dramatically change the scoring number, i.e., the percentage of correct vs. incorrect results. Different voltage values will affect some trials while leaving others with the same "score". This gives rise to the method of providing a series of predetermined voltages that had a progressively increasing value pattern. Negative values (of a corresponding pattern) provide a means of exploring (and establishing an all-inclusive capture of the "correct" result in one array of digital numbers (somewhat analogous to a map).

The network is shown as part of FIG. 12(a) as the "Topological Number Array" since it is a topographical map of the location of all the pertinent digital values representing signal-plus-noise. The function of this portion of FIG. 12(a) is as a "change sensor" when provided with a variety of sequenced inputs from the iterative sequence programmer. These inputs are utilized to cause an appropriate "column shift" as will be explained shortly.

The function described above is also referred to as a topographical change sensor (TCS). Each iterative step is performed by the injection of prescribed voltage increments from the iterative programmer. These result in changes to the noise averages. The selected process yields a result in which the algebraic sum of the incrementally introduced plus and minus voltage shifts obtained from each iteration closely approximate the magnitude and polarity of the original (but unknown) noise average (for each trial).

With the above consideration in mind, it should be perceived that there is a wide range of software techniques for carrying out the iterative process, each of which can optimize the number of iterations and interactions in the interest of efficiency and cost.

Near optimum software can result in a convergence leaving the residual noise as tabulated in FIG. 13 which shows the various voltage increments leading to substantially reduced noise averages as tabulated in the last column. The algebraic sum of these successive increments is shown in the chart and approximates the value of the original noise average for each trial.

Iterative Processing Importance & Objective

The iterative processing steps are a primary aspect of the invention. Offline processing is employed so bandwidth, and related performance, is not compromised. The result is a tolerable time delay. However, the near-real-time performance that results from the several iterations provides the means for overcoming the conventionally perceived notion that reduction in noise cannot be extended beyond that which is achieved by the simple averaging of trials. With the means provided by this invention this given approach, the noise contribution from each trial can be reduced to values arbitrarily close to zero.

The iterative process requires time (although minimal) to accomplish its objective. However, the results provide dramatic improvements in signal-to-noise ratio.

Theory Of Operation Of The Topographic Number Array

The theory of how the "topographic" configuration and its related polarity change sensing capabilities determine "noise value" changes of each and every trial will be described after a brief introduction about the characteristics of the method.

The conceptual basis of the overall method is an example of the use of numerical logic, (rather than more conventional equations) to describe functions. The method is based on examinations in terms of confirmations and contradictions that result from numerical actions. The reduction-to-practice of such a method lends itself to the use of multiple integrated "circuit functions on a chip", each providing a known, yet different, numerical impact.

The first numerical action consists of deliberately changing the polarity of the noise portion of the signal-plus-noise voltage of each and every trial. This forced change is accomplished by providing a series of contiguous voltage increments that span a range of about minus one volt ($-1.0$)

to plus one volt +1.0) in contiguous increments on the order of 0.05 volts or less: These voltage injections force the change.

It should be apparent that there is much flexibility in the number of voltage increments and the "graduation" of their spacing. Further, they do not need to be equally spaced and the range can be easily expanded or compressed dependent on the A/D converter used. As each "trial" of signal-plus-noise is entered into this all-value series of columns, a network of trials, or matrix, is formed. The addition of the input voltage (signal-plus-noise) to that which is inserted into each column creates a "new average noise" for each column. As a consequence of these additions, there results one column in which the net polarity of the noise-only portion changes (because the voltage in that column is opposite that of the noise). While this is focused usually in a specific column, this condition can occur between adjacent columns (giving rise to interpolation). The location of such a column is unknown, but its identification is eventually revealed by the iterative process. In the meantime, the TNA serves as a change sensor.

The "noise model" used for the simulation of the "stream" signal-to-noise trials is based on generally accepted Gaussian type of probability density distributions as used in radar and communications receiving systems. While such distribution is significant in conventional real-time analytical treatments, the storage of non-real-time methods used here are less susceptible to the noise model. This is because the elimination of each noise sample is literally forced to a value that goes through zero as a point of inflexion.

To illustrate this, FIGS. 13(a) and 13(b) are constructed using the simulated values of the noise. (These are not available in practice but serve here merely to illustrate the nature and effectiveness of the array of columns to accurately "locate" the "correct" noise column within the iterative matrix.) The noise is obviously not available except in simulation for use in an example to confirm the results of the invention.

FIGS. 13(c) and 13(d) illustrate the results when signal-plus-noise values are used, which is what is available in practice. FIGS. 13(c) and 13(d) show the result for a 0 db signal-to-noise.

Topographic Number Array Function.

(A) General

Figure 12C:
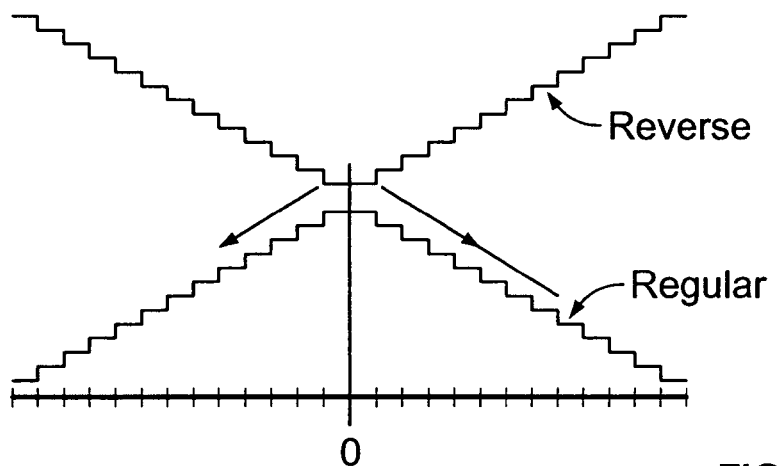
FIG. 12(c) illustrates a method of inputting preprogrammed voltages in "Regular" and "Reverse" scans in accordance with the present invention.

In a sense the TNA provides a map to guide the actions of the iterative sequence programmer in arriving at the destination which is the value and polarity of the noise average for each trial. As with the map analogy it should be realized that a sequence of alternative routes can arrive at the same destination. In practice with the TNA these involve different ways of inputting the voltage injection sequences with the programmable memories, or PROMS. Such input methods are referred to as scans and FIG. 12(c) illustrates the normal regular and "reverse" combination or a more sophisticated "A" and "V" scans in 12(d) that can improve the ability of the TNA as a change detector.

Figure 13E:
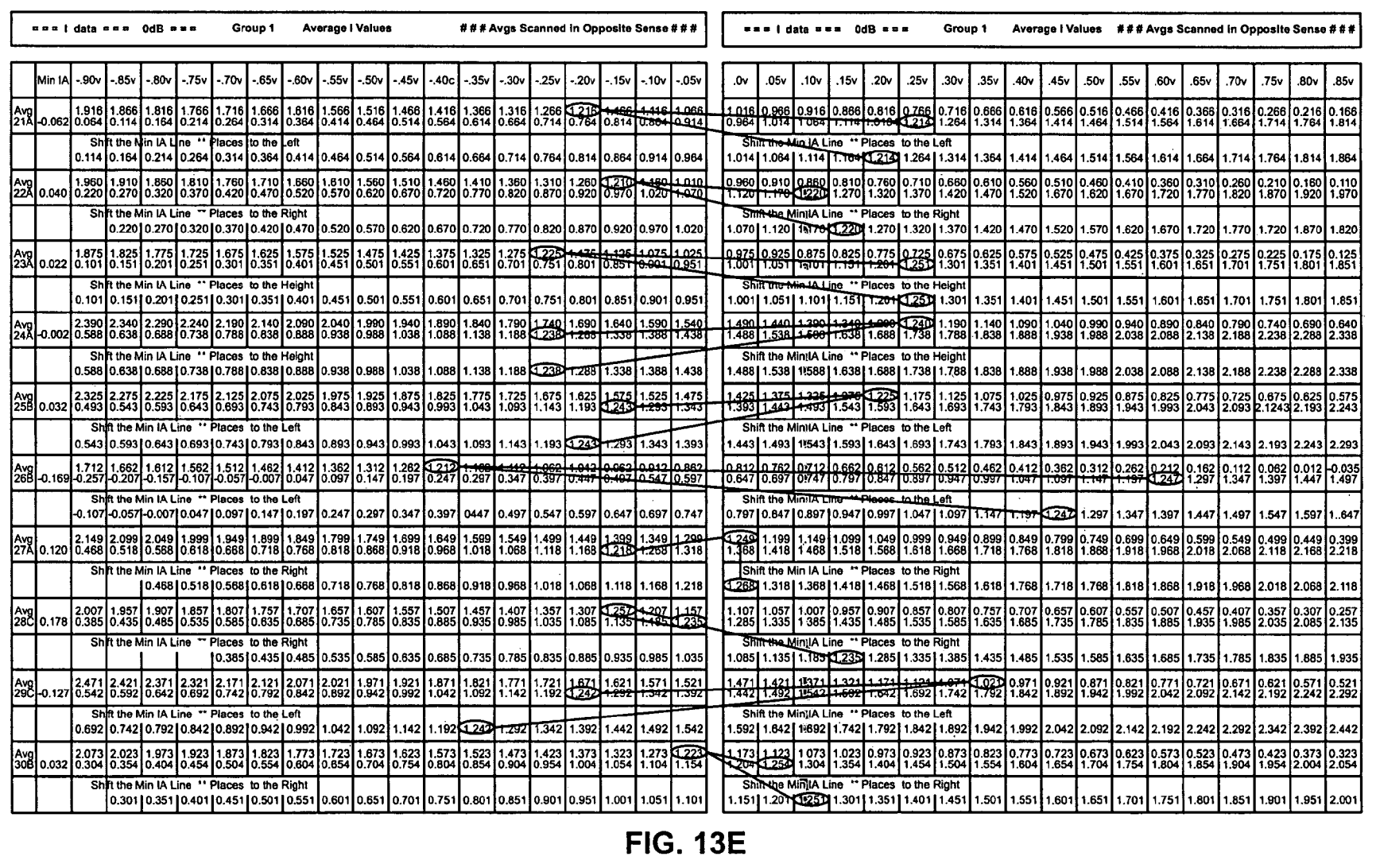

FIG. 13(e) is a composite of the information shown in FIG. 13(c), which is on the left side of 13(e), and 13(d), which is on the right side of 13(e). However, FIG. 13(e) contains an additional row of information for each trial. This is a special figure which illustrates the reason that the Iterative Sequence Program translates its instructions in the form of a column displacement or a shift to the right, or left, depending upon whether a plus or minus change is commanded. The shift column displacements corresponds to a number of column equivalents. This is determined by dividing the voltage, in this case the value of |IA| minimum shown at the left for each trial, by the column spacing increment (in this case, 0.05 volts).

The number of column shifts for the minimum |IA| value is shown by the discrete number on the line between the second and third rows.

One of the salient observations to be made is that such a shift causes symmetry of the matches between the left value with the corresponding right value about the zero column which is the topocentric point of the total topographical display. Without the shift, there is a right side or a left side bias for each trial.

With zero as the reference entry for the first iteration, the column shift from the iterative sequence programmer adds a plus or minus (right or left) additional shift to the shift that already prescribed to the minimum |IA| value column shift already taken. The asymmetry that occurs as a result serves as a polarity sensor about zero. Additional voltage commands, in the form of right or left column shifts, continuously change the asymmetry as will be explained in the next section which explains the details of the steps taken.

(B) Specific Steps

The first iterative step establishes the initial condition which uses the "zero" column in the average row as a starting point. Subsequent steps use the new column location after the first iteration to become the new reference column (in the average row) for the following steps. These functions are as follows:

1. Processes off-line to capture, store, and provide an extensive range of digital signal-plus-noise values which are presented as the Topographical Number Array.

2. Revises (updates) these as induced by inputs from the iterative sequence program (the "preprogrammed voltage values" remain constant). The iterative voltage changes are controlled as described in the "illustrative sequence of iterative programmer".

3. An initial entry reading is obtained from the top or "average" row at the zero column (this entry corresponds to the actual signal-plus-noise from average of the sextet of FIG. 11.

4. A value of the same magnitude is selected from the second row (the minimum |IA| row) by the processor and the corresponding column location is noted. This constitutes a match as provided by the number matcher of FIG. 12(a) and need not involve equality sensing.

5. Starting at the new column and row of the output of the Column Displacement Shifter, the iterative voltages are translated into a corresponding number of columns. The resulting voltage reading is a signal-plus-noise at the new column is matched with row 1 (the average) to produce a new row 1 (average) and column. This can be done by the equality sensor.

6. As a result, the "new" column location of the average row may shift from its original left or right location to the opposite (right to left) location. Such a change indicates a polarity change.

The above six steps establish a new reference from which to start and repeat steps 4, 5, and 6 using the new column starting location.

The "new" match that will occur between the "new average I value at its shifted column location in step 6 will provide in the average column row an indication (by column location) as to whether the column location has:

(a) become nearer to zero, or (b) become farther from zero, or (c) gone through zero indicating a polarity reversal This information is the type needed to guide the iterative feedback process.

Figure 12D:
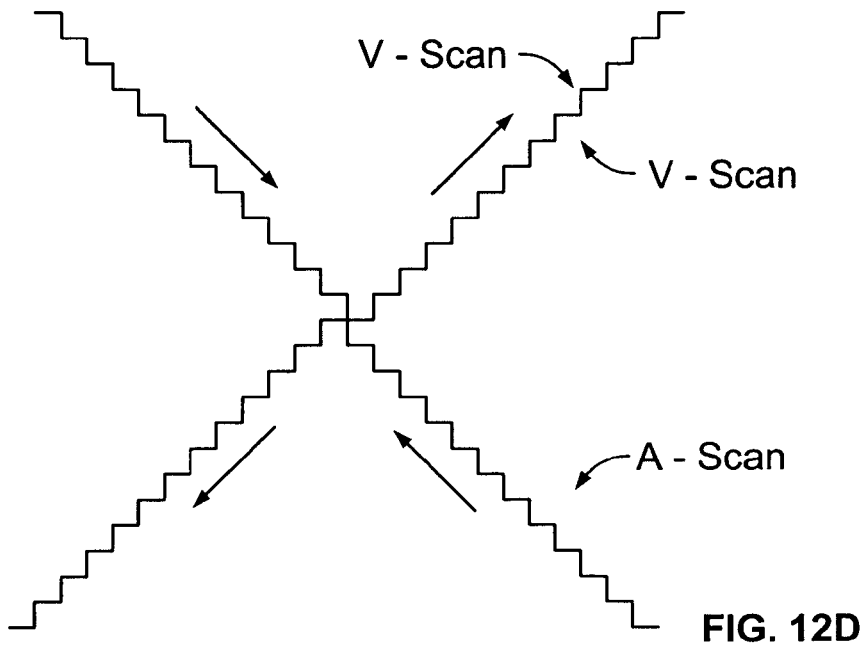
FIG. 12(d) illustrates a method of inputting preprogrammed voltages in "A" and "V" scans in accordance with the present invention.

To extract the information (as to column choice) it is important that the voltage information be introduced or "scanned" into the iterative matrix in a manner that will produce a "proper error sense" when making voltage comparison between entries from two appropriate columns. The pertinent columns are either of the first or second trials and the average of these two trials. To accomplish this, the "average row" is scanned (i.e., the voltages introduced) in a minus to plus manner which is the opposite of that used in trial 1 and trial 2. This insures that the error sense at the different "zero noise transition points" are opposite rather than "parallel", i.e., having like slopes as illustrated in FIGS. 12(c) and 12(d).

Variations include V scans and A scans that permit the scanning directions to be opposite on the right from the that of the left (and vice versa).

Some trials were made with slightly difference but equally spaced voltage increment on the right from those of the left given rise to the potential for applying Vernier principles to obtain closer readings.

The ultimate improvement in noise reduction will be limited by the ability to measure the voltages from the pertinent antenna elements. Such precision will depend upon the mechanical "accuracy" of the array. Since the array can be designated and manufactured by numerical controlled (especially for relatively "small" antennas) the potential for improvement is large. The digital nature of the electronic process will preserve the precision of the antenna outputs.

The improvement is estimated to be in the 30–40 db.

Illustrated Sequence of Iterative Programmer

The incremental voltages used in iterations 2 and 3 are selected to help sort out the large noise values from the lower noise values. When these voltages are made to be the same magnitude, the following results: if the polarity remains the same for both iterations 2 and 3 (as when the amount of noise is large), the two appropriate polarities are the same and the two voltages will be added so that twice the increment will be effective at the end of the 3 iterations. Conversely, if the sign changes between steps 2 and 3, the net effect will be zero, yielding the same result as at the end of iteration 3 as that at the end of iteration 1, i.e., no change. The additive condition (either both plus or both negative indicates a relatively large noise that will require more like polarity increments to reduce it. On the other hand, the reversion to iteration I will indicate a relatively small noise (below about 0.25) for which a series of oscillating polarities is appropriate for the convergence to a very low value. Accordingly, the pattern of the appropriate incremental changes is established at the end of step 3. During latter iterative steps, the magnitude of the voltage increments of suitable polarities are reduced progressively (by factors of 2, for instance).

Access Key Analogy

It is hoped that the information locked in the TNA could be retrieved from the pertinent column (where the relative position corresponds to the noise magnitude and sign) could be unlocked by a clever "access key". The workings of the iterative process proved to be such a key. Rather than being like a mechanical key that activates the tumbler. The iterative process "key" is more analogous to a combination lock in which the tumblers are accessed in a serial manner, thus achieving the right combination.

While most of the explanation has centered around a 7×3 array, one attractive alternative is a 5×4 array. As a consequence, a 5×4 array, consisting of 4 vertical elements formed into 2 groups at wavelength spacing and consisting of 4 left and 4 right elements in each group is shown in FIG. 12. Thus, an octet replaces the sextet to provide the average I (or Q) and the I (or Q) of the minimum IA or QA. Shown as FIG. 12(b), a 5×4 array is more symmetrical and is more appropriate for communications applications.

Near optimum performance can result in convergence and residual noise as tabulated in FIG. 14, which shows the various voltage increments leading to substantially reduced noise averages tabulated in the right-most column.

Phase Multiplication Process for Beam Sharpening with S/N Realization (Amplitude)

The I and Q "noise-purged" signals are used to form the arctangent of Q/I, an angle used in the phase multiplication function. This is done after the I's and Q's of very low noise have been achieved through the iterative processing. Without this achievement the phase multiplying process would not perform its intended function.

Under the above circumstances, the performance comparison when using an antenna array configured in accordance with the present invention is shown in FIGS. 14(a), I data, and 14(b), Q data.

Figure 15A:
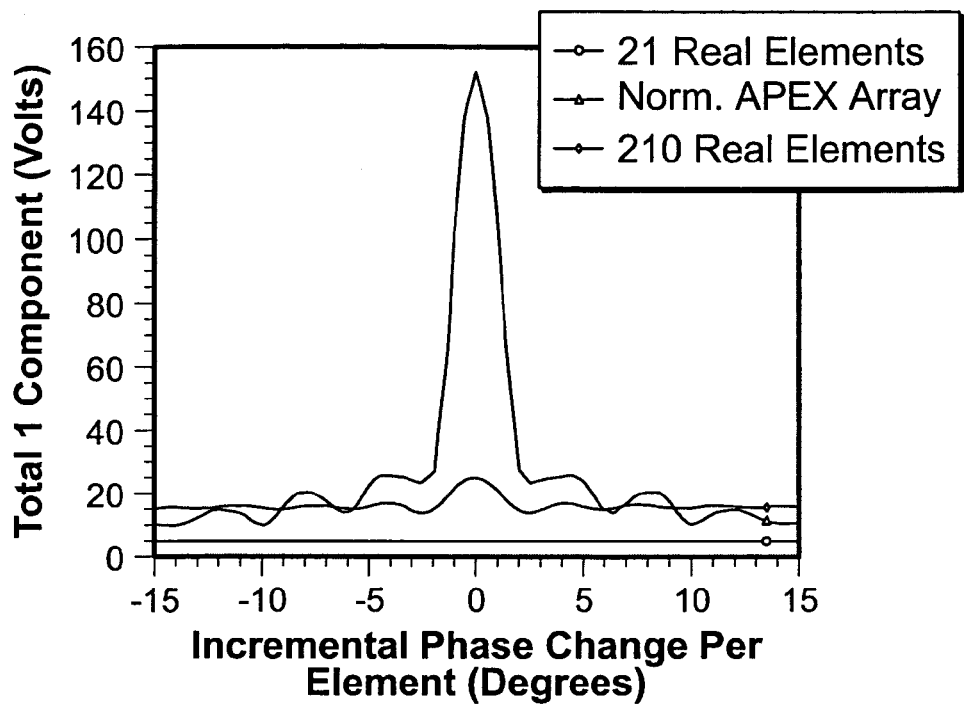
FIGS. 15(a) and 15(b) are graphical representations illustrating an example of the improvement in Signal-to-Noise and beam shaping resulting from the present invention.
Figure 15B:
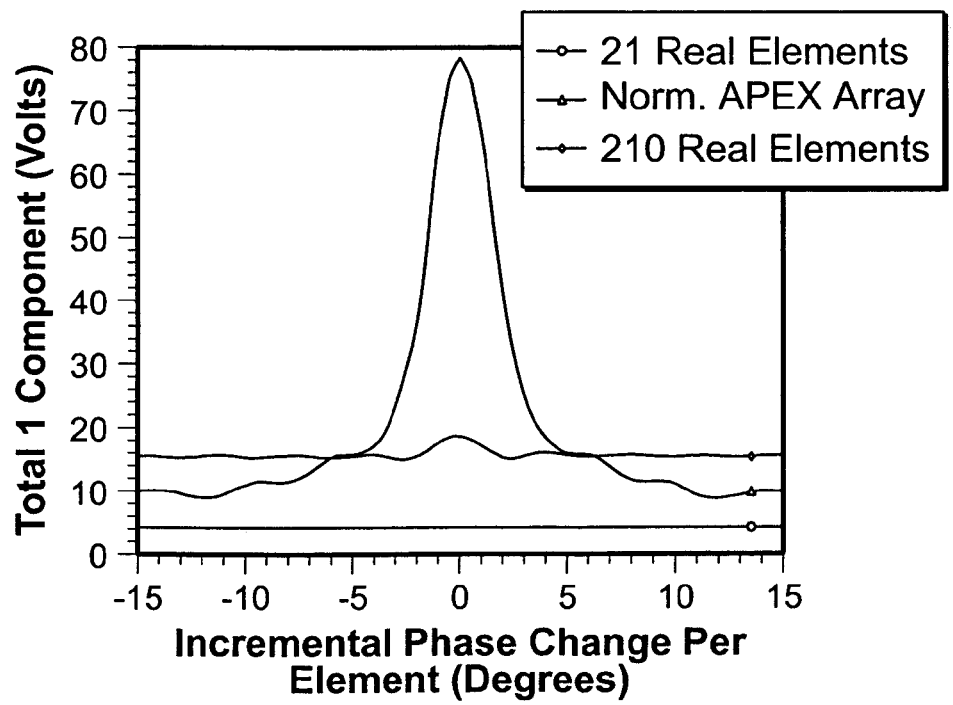

FIGS. 15(a) and 15(b) illustrate the dramatic improvement potential. The improvements afforded by the present invention are highlighted by the normalization of its results to an equivalent 210 element array. This is for a phase multiplier from 1 to 10 (i.e., X2, X3, X4 . . . X10). Results are also shown for the original 21 element array (21 elements are divided into 3 groups of 7 each in the simulated example). The 3 groups act to improve the reduction of external interference.

There is a new voltage vector created at each new phase resulting from each multiplication of the basic angle. This basic angle is the arctangent of "a noise-purged Q" divided by "noise-purged I". The magnitude of each new vector is the square root of the squared Q and the squared I and is constant for each vector created by the phase multiplication. Each new vector is resolved into new Q and new I components.

The basic angle (arctangent of Q/I) is determined by the angle of arrival of the plane wave of the signal with respect to the array normal. This yields different angles $\phi$ at different actual angle $\theta$, measured from the normal, giving rise to the slope of response with respect to the 0=o peaks.

Figure 16A:
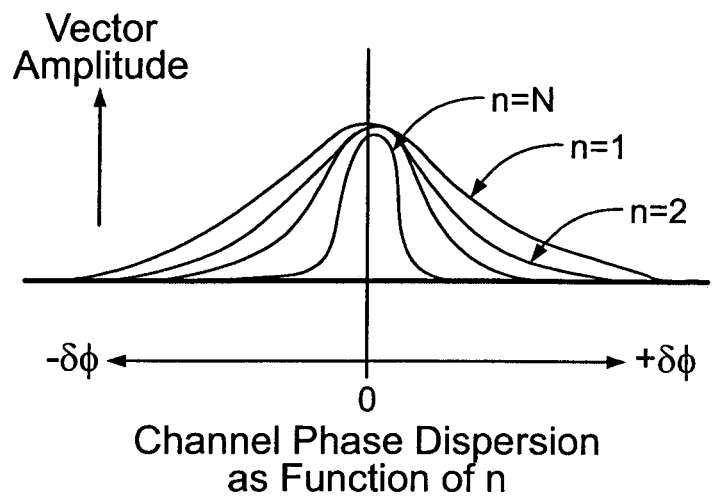
FIG. 16(a) is a graph illustrating the effects on the signal vector amplitude response vs. the directional phase (theta) angle in accordance with the invention.
Figure 16B:
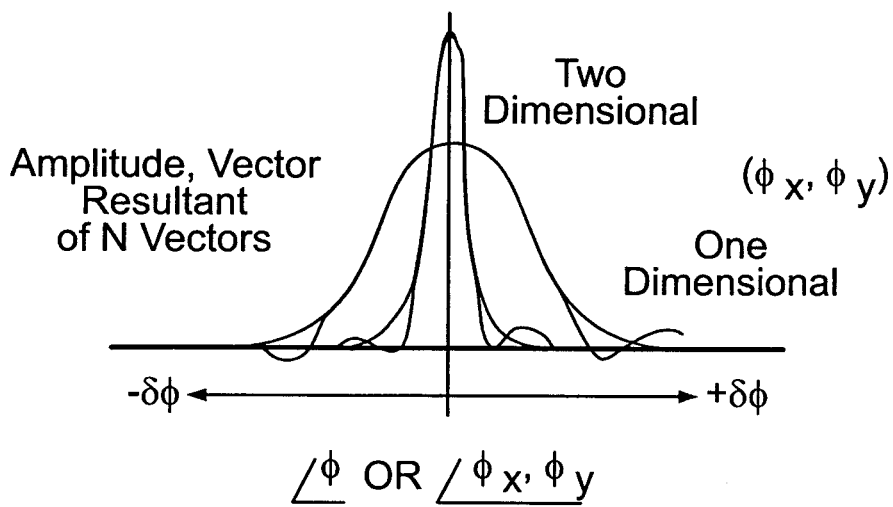
FIG. 16(b) is a graph illustrating the effects on the signal vector amplitude response vs. phase angle (theta) on a two dimensional basis.
Figure 16C:
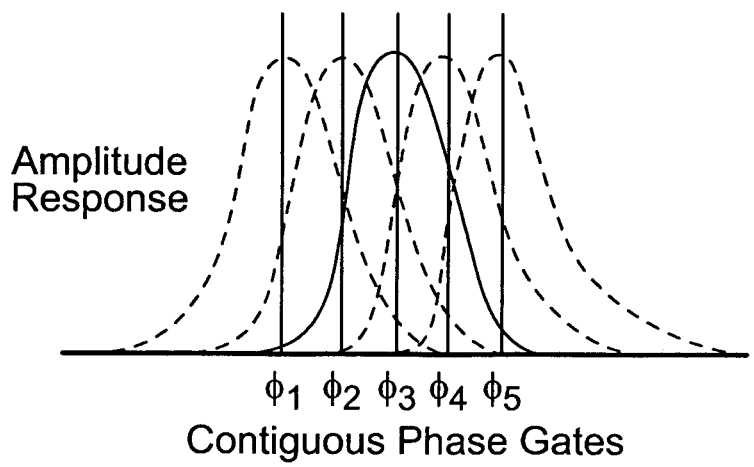
FIG. 16(c) is a graph illustrating the effect on signal vector amplitude response vs. phase as a function of additional contiguous phase gates.

It should be recognized that the response pattern of FIGS. 16(a)–16(c) is analogous to a practical "phase-gate". The great reduction of thermal noise affected by the processing of the present invention has overcome phase gate shortcomings described in connection with FIG. 9.

What is claimed is:

1. A stand alone receive system capable of minimizing affects of thermal noise introduced by the amplification of a signal, said system comprising:

a single stand-alone array antenna operable to receive a plurality of overall receive signals;

an amplifier operable to amplify each of said overall receive signals;

an analog to digital converter operable to convert said overall receive signals from an analog format to digital values;

a storage device capable of storing said digital values and operable to create a matrix comprising a plurality of rows and columns wherein said rows and columns contain information based on said digital values;

a processor operable to iteratively process said digital values to determine said information and place said information in locations within said matrix;

a phase multiplier operable to multiply signal-only data from said processor with a plurality of phase values and output phase multiplied data; and a combiner operable to combine said phase multiplied data.

2. A receive system according to claim 1 further comprising;

a local oscillator operable to generate a reference signal; and a mixer operable to heterodyne said reference signal with said overall receive signals to generate a lower frequency version of said overall received signals.

3. A stand alone receive system according to claim 1, wherein a zero phase reference is established for a carrier signal that is synchronized to an internal system timing generator from which reference in-phase (I) and quadrature (Q) components are established rapidly, said I and Q components being processed independently over a relatively wide bandwidth.

4. A receive system according to claim 1 wherein said analog to digital converter is further operable to separately generate digital in-phase and quadrature samples of said overall receive signals wherein said quadrature samples are approximately 90 degrees out of phase with respect to said in-phase samples.

5. A stand alone receive system according to claim 1 wherein said antenna comprises a two-dimensional array of elements grouped into a plurality of corresponding right-left groups, each right-left group being centered around a center group wherein each of said elements is spaced an integer multiple of a half-wavelength from a respective adjacent element, such an arrangement being suitable for providing signal outputs accomplished by a non-phase dispersive multiplying function.

6. A stand alone receive system according to claim 1 wherein in-phase (I) and quadrature (Q) signal processing effectively removes any affects of an inherent signal phase, Beta, and an electrical phase angle, phi, is obtained that corresponds to a physical angle, theta, which is approximately equal to a phase difference between a normal to the antenna and a receive angle of said overall receive signals, to measure the electrical phase angle, phi, of said receive signal with high precision as a result of achieving low phase dispersion when multiplied.

7. A receive system according to claim 1 wherein said phase multiplier multiplies a phase difference, phi, by a plurality of integers, said phase difference being the difference between a real phase of said received signals and a theoretical phase of said received signals, said theoretical phase being determined from a receive angle of said overall receive signals and wherein said phase multiplication is accomplished without significant phase dispersal caused by noise.

8. A stand alone receive system according to claim 1 wherein a plurality of outputs from said phase multiplier that experience negligible phase dispersion because of the absence of noise are coherently combined to increase an angular sensitivity of the receive system.

9. An iterative processing method used in conjunction with a stand alone receive system comprising an antenna array with two interoperable arrangements of elements, said antenna array operable to provide signal-plus-noise outputs to the iterative processing method, which does not require additional external augmentation and does not depend on polarization discrimination, said iterative processing method comprising:

achieving dramatic signal-to-noise ratio improvement;

improving the ability to distinguish weak signals received by said antenna array, and improving angular resolution to discriminate against near-beam-edge directions, wherein said angular resolution is improved by a phase multiplying process using two or more groups of said receive signals, in which the noise has been reduced to permit non-dispersive phase multiplication, each group being physically displaced from the other groups by having a phase center separated from other groups by multiples of one-half wavelength.

10. A method of improving an angular resolution in a stand alone receive system, said method comprising aggregating signal-plus-noise data output from an antenna into a plurality of groups, each group containing data having a similar phase, wherein the phase corresponding to each group is a multiple of the phase corresponding to the other groups, said multiple being determined by a spacing between right and left elements of each group from the center of the antenna array and wherein further, said groups are formed by combining data from respective right and left antenna elements and said right and left antenna elements are equidistant from a central common reference located at a center of the array of elements and corresponding to a phase angle, phi, of zero phase.

11. A method as claimed in claim 10, said method further comprising the steps of:

phase multiplying said angle, phi, from each group; with negligible phase dispersion caused by noise; and processing the resulting vectors from the phase multiplying step from all of the groups in order to provide improved angular discrimination against signals from unwanted angle directions outside a resultant sharpened beam.

12. A method according to claim 10 further comprising:

phase-gating of the angle, phi, of the received signal to accept only predetermined desired phases irrespective of random noise affects.

13. A method as claimed in claim 10, said method further comprising the steps of:

iteratively processing the data in said group to reduce a noise portion of a signal plus noise average to determine a relatively noise-free representation of the angle, phi, associated with an arrival direction of the signal from said group by aggregating the modified Q's and aggregating the I's so as to be able to divide the overall digital net values of the plus and minus Q's by the net in-phase values I so as to determine the angle from the arctangent of each Q/I quotient.

14. A method as claimed in claim 13, wherein said iterative processing step includes the step of sequentially applying a series of digital values to said data to alter a value representing signal plus noise with the result of each iteration to obtain an estimate of a noise portion of the signal plus noise by algebraically summing values of the several iterative steps.

15. A method as claimed in claim 13, wherein said iterative processing step includes;

sensing, in a bipolar manner, a change in the data, caused during each iteration, wherein a magnitude of the change is determined equally for both plus and minus values of the noise component of the signal-plus-noise samples in a symmetrical bipolar manner and the result of each iterative value applied is assessed to determine the next subsequent value in a way that constitutes an overall feedback system with the signal held at a constant level for two or more successive trials.

16. A receive system comprising;
an antenna array with right and left side elements operable to receive signal-plus-noise signals;
a means for aggregating outputs of selected right and left side elements of said antenna array to form an aggregation of signal-plus-noise voltages in digital form, said digital values being used to modify a topological number array (TNA) in several steps to form a near real time estimate of the noise for each trial; and
a processor operable to identify a particular entry of a subset of said aggregation that has the least absolute deviation from an average of the subset,
wherein said identified entry represents an entry whose noise is closest to the average noise component of the signal plus noise average of the aggregate group.

17. The receive system as claimed in claim 16 wherein said subset includes separate in-phase (I) and quadrature (Q) voltage outputs and provides the signal and noise in a first row of a two row numerical array of digital numbers with a second row consisting of the signal plus noise average for each of the separate I and Q aggregations.

18. The receive system as claimed in claim 17 further comprising:
a modification device operable to modify the signal plus noise outputs of said two row numerical array, wherein said modification is performed by adding progressive and contiguous predetermined values both plus and minus over a pertinent range so that a relatively large number of different entries are formed that constitute columns of a matrix containing an array of numbers in which each column corresponds to a plus or minus value of the added or injected value whose polarity is opposite to that of the noise, and wherein further, the total array provides a topological representation or map of the totality of appropriate signal plus noise values as segregated by column location for each row.

19. A receive system according to claim 16 wherein a receptivity to radio frequency signals provides a signal strength, relative to inherent noise, characteristic that is equivalent to that which is expected from an antenna with a larger aperture, and wherein said signals have improved directivity and angular resolution over a wide range of radio frequencies permitting better utilization of an allocated or an independently chosen frequency spectrum.

20. A stand alone receive system comprising;
single antenna array with right and left side elements operable to receive signal-plus-noise signals;
a deviation determining device operable to select datapoints, representing data from each of said antenna array elements, and arrange said datapoints in a sextet, octet or other evenly distributed group for each in-phase (I) and quadrature (Q) representation of said signal-plus-noise signal,
wherein said deviation determining device determines a deviation for each individual datapoint of said sextet, octet or other evenly distributed group, from the average of each group to determine which datapoint constitutes a minimum absolute value of said deviations from said average, said deviation and said average being used to form a topological map of numbers that correspond to modified numbers produced by adding pre-programmed values to said data.

21. A method of processing signals received by a receiving system, said method comprising:
forming left and right topological groupings of a topological number array of digital representations of said signals, said groupings formed about a topocentric reference of the two groupings that corresponds to a zero value injection from a stored predetermined value injection pattern comprised of positive and negative steps, which are incrementally increasing in magnitude, in each of two or more rows of similar increments having a common topocentric zero reference.

22. A method of processing signals received by a receiving system according to claim 21, wherein said increasing positive and negative steps are associated with said groupings in reverse order, from minus to plus in one of the two, or more, rows to provide polarity senses that are opposite to each other to sharpen an error response of column entry comparisons.

23. A method of processing signals received by an array of a receiving system, said method comprising;
configuring a numerical array of modified signal-plus-noise values representative of said received signals such that each noise portion of said signal-plus-noise value transitions through zero at a location in the array, said location being determined by the polarity and magnitude of said noise; and
sensing how the injection of a programmed iterative value will change a relative location within said array by sensing, in progressive steps, when each injected iterative value causes a match in the numerical values of signal-plus-noise from two rows of the numerical array to be further from, or closer to, a topocentric center of left and right portions of the array.

24. The method according to claim 23, further comprising:
providing equilibrium about a center of the array; and
sensing iterative changes in a symmetrical fashion in said modified signal-plus-noise values by using plus or minus deviations nearest to the average,
wherein said equilibrium is achieved by imposing left or right incremental column shifts in the row corresponding to a plus or minus deviation nearest to the average and wherein said incremental shift corresponds to said deviation in terms of an incremental shift.

25. A method according to claim 24, wherein said left or right incremental shifts in said average row and said row corresponding to a plus or minus deviation nearest to the average are reversed with respect to each other in two pertinent rows.

26. A method according to claim 24 further comprising:
producing a sequence of controlled steps to create a series of discrete voltage values using an iterative program in which each value alters the signal plus noise value to create a new signal plus noise value for each entry of both left and right portions of the topographical numerical array.

27. A method according to claim 26 further comprising:
sensing how each iterative step alters the entries of selected rows of the topographical digital numerical array; and
determining when a numerical match of values occurs between various columns of said array.

28. A method according to claim 27 further comprising:
reading a column entry from the average row and the column in another row, different from said average row, that has been shifted by an amount equal to the algebraic sum of the minimum deviation value together with a left or right shift furnished as part of an instruction from said iterative program.

29. A method according to claim 28 further comprising:
holding a receive signal constant during a frame in time by using a memory device,
wherein said frame in time consists of a sum of several iteration times so that successive signal frames provide a noise-reduced modulated signal.

30. A method in accordance with claim 29 wherein each successive sample has the benefit of several iterations and accommodates modulation of various different signals for different applications and wherein a continuing sequence of frames of information is provided which comprise desired segments of a modulated signal with a noise portion of said modulated signal reduced and a desired modulated signal values are provided by a series of said frames of information.

31. An integrated circuit operable to provide frames of information as described in claim 30 to work in one or more pairs to form a parallel processing arrangement in which separate signal frames can be captured and stored simultaneously so that the output of each signal frame can be utilized individually and serially to construct a desired noise-reduced signal by successive frames that provide modulation characteristics of the sequence, wherein said processing arrangement is performed in a relatively short period of time manifested as a signal delay that does not compromise a bandwidth of the system.

32. A method according to claim 27 further comprising:
establishing an initial reference at a zero column at a topocenter of the topological numerical array for the first iteration and thereafter using a resulting column location for each succeeding iteration to constitute the next reference column for each succeeding iteration.

33. A method according to claim 32 further comprising:
determining in a bipolar manner when the polarity of the noise portion of a signal plus noise combination changes sign in response to a predetermined value injection; and
sensing deviations in the noise in the absence of knowledge regarding the polarity of the noise prior to said value injection,
wherein said method is accomplished through use of a topographic digital number array that covers a plus and minus range and is in equilibrium about its topocentric value, which is zero.

34. A method according to claim 33 further comprising:
iteratively processing said signals by employing the bipolar sensing property to respond to a series of programmed voltage injections, each voltage injection corresponding to a digital number, as provided by an iterative program that results in a process that converges in decreasing increments,
wherein an algebraic sum of appropriate amounts from each closed loop iterative voltage provides an equivalent noise voltage, which approximates an actual noise voltage portion for each signal plus noise sample.

35. A method according to claim 34 further comprising:
deriving an array of numbers by supplying a prescribed series of contiguous numbers that progressively alter an average of signal plus noise values of said received signals to provide a topographical map of numbers;
determining, from said topographical map of numbers when a noise portion of said signal plus noise values changes, or comes closer to changing its polarity, in response to an additional executed change in the form of column displacement or shift as provided by the iterative sequencing program; and
repeating said deriving and determining procedures while storing original signal plus noise values; and
initially matching the numerical value in the shifted column with that of the zero column and after each successive iterative step, matching the numerical value with an entry in a new column with that of the new "average" row column that results from the preceding step.

36. A method in accordance with claim 35,
wherein a response to the prior applied value step that results in a left or right column shift is a basis for the next step; and wherein further,
if said response is closer to zero, a step of the same polarity (or column shift) and of equal or diminished amount is used in the process; and
if the average row match has changed from one side of the topocentric or zero column to the opposite side, then a value with a polarity opposite to the polarity used in the previous step and reduced in amount is used in the process.

37. A method in accordance with claim 36, wherein each of said iterations forms a basis for a next iteration until successive iterations achieve an unlocking of information in the form of an estimate of an amount of unwanted noise.

38. A stand alone antenna system operable to enhance signal reception capabilities so as to find a signal of unknown magnitude from an unknown direction with only an approximate frequency band being known with such enhancement being achieved without the need to receive any special additional transmitted signals to augment the enhancement process and using a process sequence of steps controlled by an iterative programmer to alter signal plus noise entries into right and left portions of a topographical numerical array so as to sense the consequences and determine the next steps with a logic that converges so that an algebraic sum of the voltage steps yields an estimate of broadband noise for at least two successive trials, in which respective signals are the same, wherein the overall objective is to provide signals that are noise-free so as to be able to multiply a resulting angle of arrival to achieve antenna patterns without phase dispersal consequences.

39. A versatile stand alone antenna and receiving system as set forth in claim 38, in which rapid processing is done at the carrier frequency as represented at an intermediate frequency amplifier which is part of a heterodyned system for the signal, including noise.

40. A versatile stand alone antenna and receiving system as set forth in claim 38, wherein processing is performed in each phase group separately to yield a plurality of different corresponding phase angles with these phases multiplied as part of the phase multiplying scheme and because of their different phase displacement simultaneously producing a multiplication of a baseline separation to create an angle resolution ability that can help discriminate against signals from unwanted near by angular directions.

41. A versatile stand alone antenna and receiving system as set forth in claim 38, further comprising a sequence of steps as controlled by the iterative programmer to create a series of digital values representing discrete voltage values to create new signal plus noise digital values for each entry into both left and right portions of the topographical number array; sensing how each such iterative step after the entries of selected adjacent rows of the topographical digital numerical array and determining the consequences of each such step able to predict the subsequent step in a way that will produce a converging process in which the next increment is either of the same or opposite polarity and of the same polarity the magnitude and wherein next digital voltage amount is either the same or reduced by factor such as one-half with the overall consequence being that the algebraic sum of the digital steps represent our somewhat equal to a close approximation of the magnitude of the noise for that row or trial except that the overall plus or minus polarity sign for that role will be reversed, thereby yielding a highly precise estimate of the unwanted noise with an ever increasing accuracy as the number of iterations is increased.

42. A versatile stand alone antenna and receiving system comprising:

means for determining an angle of arrival in each of a plurality of phase groups, and multiplying such a digital value with minimal phase dispersal using low noise achieved results of in-phase and quatrature results, such a precise phi result being determined by dividing an overall low noise quadrature result by an overall low noise in-phase result that produces the arc tangical of the angle phi, and with this phase angle being multiplied by integer multipliers so as to create equivalent pseudo-antenna elements without excessive phase dispersion that would have been caused by noise.

43. A versatile stand alone antenna and receiving system as claimed in claim 42, further comprising:

means for resolving each of a plurality of synthetic vectors into new low noise in-phase and quatrature components with the sum of these many new components being properly segregated and accumulated in terms of in-phase and quatrature to create a much sharper beam with greatly enhanced capability to detect weaker wanted signals and better discriminate against signals from unwanted directions by virtue of the derived antenna beam patterns.

44. A versatile stand alone antenna and receiving system comprising:

means for using a nearly continuous estimate of a received signal amplitude at, or related to, a carrier signal amplitude, wherein an antenna pattern is synthesized after a noise portion of a signal plus noise input has been significantly reduced by iteratively multiplying an effective electrical phase angle by one or more integers; and means for determining when alternate plus carrier half cycles and subsequent negative half cycles have equal amplitude to provide an enhanced signal to noise ratio for the received signal.

45. A versatile stand alone antenna and receiving system as claimed in claim 44, further comprising providing the option of duplicating the system to create multiple probes that operate in parallel so as to minimize time required to select a correct signal probe of the multiprobe process.

46. A versatile stand alone antenna and receiving system as claimed in either of claims 44 or 45, further performed at the carrier frequency and operable to accommodate rapidly fluctuating received signals that manifest themselves after the noise has been substantially removed.

47. A versatile stand alone antenna and receiving system comprising:

means for receiving a receive signal within a wide system bandwidth, wherein the bandwidth is chosen such that noise having a level substantially equal to the level of the receive signal is permitted to be received automatically into the system; and means for combining one or more surrogate carrier values with the receive signal, wherein the surrogate carrier values comprise one or more predetermined signals generated by systematically adding or subtracting each of a series of incrementally-spaced values from the receive signal; and means for determining which of the surrogate carrier values is nearest to the level of the receive signal.

48. A versatile stand alone antenna and receiving system comprising:

means for searching and acquiring a desired signal in a time synchronization and detection process resulting in synchronization with a timing clock that samples both in-phase and quadrature analog-to-digital converters so as to establish a system reference phase;

means for determining when alternate plus carrier half cycles and subsequent negative half cycles have equal amplitude to provide an enhanced signal to noise ratio for the received signal; and means for introducing an appropriate sequence of surrogate signal estimates, wherein a typical search involves a set of such surrogate values in which at least one of surrogate signal estimates causes a signal to distinguish itself from the background noise so as to create a vastly improved signal-to-noise ratio.

49. A versatile stand alone antenna and receiving system comprising:

means for providing a joint signal and noise process of several iterative steps that employs digital values that are successively added algebraically to an array of stored digital information that represents a numerical array of signal-plus-noise digital values used in a preplanned way starting with initial values that are obtained from two or more trials in which each trial consists of random noise values combined with two signal half cycle values that are essentially equal to each other during these two trials with such equality being achieved by the sampling process used in analog-to-digital conversion in which the sampling as controlled by a system clock is performed for the two successive samples at the same phase, wherein the phase is the phase reference of the system, wherein the values-added are assigned, as signal values, or noise values during the different steps of the overall process and with the steps being independent because the signal does not change the noise nor does noise change the inherent signal.

50. A data processing method comprising:

iteratively adding digital values to an array of stored digital information that represents a numerical array of signal-plus-noise digital values, wherein the array comprises initial values that are obtained from two or more trials including random noise values combined with two signal half cycle values that are essentially equal to each other during these two trials because of the repeatabilty of a sinewave carrier and wherein the initial values comprise two or more respective successive samples sampled at the same phase, wherein the phase is the phase reference of the system;

assigning the values added to be signal values or noise values during different iterations of the data processing method; and processing two or more successive data samples or trials to confirm that an endomorphic process has been achieved such that a combination of trials together provide a frame of information concerning a signal carrier at a rate such that a series of frames accommodate a changing nature or modulation of the carrier.

51. An iterative data processing method comprising:
  iteratively adding digital values to an array of stored digital information that represents a numerical array of signal-plus-noise digital values, wherein the array comprises initial values that are obtained from two or more trials including random noise values combined with two signal half cycle values that are essentially equal to each other during these two trials and wherein the initial values comprise two or more respective successive samples sampled with respect to the phase reference of the system;
  assigning the values added to be signal values or noise values during different iterations of the data processing method; and
  extracting phase modulation data from a carrier signal, wherein the modulation is in the form of a sinusoidal pattern between two phase excursions accomplished by a pair of carrier instances that use the same phase reference for a plurality of such pairs which are used successively to reproduce the modulation from a series of frames of enhanced information.

52. A versatile stand alone antenna and receiving system comprising:
  a single stand-alone array antenna operable to receive a plurality of overall receive signals;
  means for determining when alternate plus carrier half cycles and subsequent negative half cycles have equal amplitude to provide an enhanced signal to noise ratio for the received signals; and
  a processor that receives the overall receive signals and detects and acquires very weak signals without the assistance of a pilot pulse, a diversity receive method or pre-established information related to signal conditions of the receive signals.

53. A versatile stand alone antenna and receiving system comprising:
  a single stand-alone array antenna operable to receive a plurality of overall receive signals;
  a processor that receives the overall receive signals and enhances a detectability and acquisition of useful information related to the receive signals by first reducing the noise inherent in the receive signals and then comparing the respective receive signals to multiple predetermined surrogate values and determining when the amplitude of the receive signals is closest to one of the surrogate carrier amplitude values.

54. A versatile stand alone antenna and receiving system as claimed in claim 53, wherein the respective comparing and the determining of the receive signals in said processor is performed in-parallel with each other to reduce the amount of time expended to determine when the amplitude of the receive signals is closest to the one surrogate carrier amplitude value.

55. A method for estimating the strength of a carrier signal in a receive system, the method comprising:
  reducing noise inherent in the carrier signal by at least determining when alternate plus carrier half cycles and subsequent negative half cycles of the carrier signal have equal amplitude;
  iteratively comparing a series of predetermined surrogate signal amplitudes to the amplitude of the carrier signal; and
  detecting a match between one of the predetermined surrogate signal amplitudes and the amplitude of the carrier signal.

56. A method as claimed in claim 55, wherein said iteratively comparing and detecting steps are performed within two or less cycles of the carrier signal.

57. A method as claimed in claim 56, wherein a process of integrating a plurality of different independent signal-plus-noise samples is avoided as unnecessary.

58. A method as claimed in claim 56, wherein the two or less cycles of the carrier signal constitute a slight departure from real-time processing and enables processing of a wider bandwidth of received signals in the receive system as compared to the bandwidth of received signals present in systems that utilize at least one of integration processing and real-time processing.

59. A method as claimed in claim 58, further comprising realizing an increase in signal-to-noise ratio due to the processing of the wider bandwidth of received signals.

60. A data processing method for removing noise from a noise-plus-data signal received by an antenna, the process comprising:
  determining an estimation of an amount of noise resident in each of successive samples of the noise-plus-data signal, wherein the amount of time necessary to determine the estimation of the noise for each sample is equal to the period of a carrier wave of the received noise-plus-data signal; and
  subtracting the estimated noise for each sample from the corresponding samples of the noise-plus-data signal to generate a noise-reduced sample,
  wherein a constant of integration for the method is bi-polar and tends to average to zero.

61. A method as claimed in claim 60, wherein an improvement in an amount of entropy is achieved as a result of the reduction in the amount of noise present in the received signal.

62. A multi-stage receive system comprising:
  a front-end processing section operable to improve a signal-to-noise ratio of a wideband receive signal, wherein said front-end processing section includes a front-end processor operable to iteratively compare a series of predetermined surrogate signal amplitudes to the amplitude of a carrier signal and detect a match between one of the predetermined surrogate signal amplitudes and the amplitude of the carrier signal; and
  a back-end processing section operable improve the signal-to-noise ratio of a narrowband signal derived from an output of said front-end processing section.

63. A multi-stage receive system as claimed in claim 62, wherein said back-end processing section includes a back-end processor operable to perform at least one of Doppler processing, range-gate processing and Fast Fourier Transform processing.

64. A method of processing signals received by an array of a receiving system, said method comprising:
  configuring a numerical array of modified signal-plus-noise values representative of said received signals such that each noise portion of said signal-plus-noise value transitions through zero at a location in the array, said location being determined by the polarity and magnitude of said noise;
  sensing how the injection of a programmed iterative value will change a relative location within said array by sensing, in progressive steps, when each injected iterative value causes a match in the numerical values of signal-plus-noise from two rows of the numerical array to be further from, or closer to, a topocentric center of left and right portions of the array; and
  sensing iterative changes in a symmetrical fashion in said modified signal-plus-noise values by using plus or minus deviations nearest to the average.

* * * * *